United States Patent
Wu et al.

(10) Patent No.: US 11,451,452 B2
(45) Date of Patent: Sep. 20, 2022

(54) MODEL UPDATE METHOD AND APPARATUS, AND SYSTEM

(71) Applicant: Huawei Technologies Co., Ltd., Shenzhen (CN)

(72) Inventors: Zhongyao Wu, Shanghai (CN); Qinghua Chi, Shanghai (CN); Yixu Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/081,570

(22) Filed: Oct. 27, 2020

(65) Prior Publication Data

US 2021/0044488 A1 Feb. 11, 2021

Related U.S. Application Data

(63) Continuation of application No. PCT/CN2019/084148, filed on Apr. 24, 2019.

(30) Foreign Application Priority Data

Apr. 27, 2018 (CN) .......................... 201810393730.0

(51) Int. Cl.
*G06F 15/173* (2006.01)
*H04L 41/14* (2022.01)
(Continued)

(52) U.S. Cl.
CPC ........ *H04L 41/145* (2013.01); *H04L 41/0893* (2013.01); *H04L 41/16* (2013.01)

(58) Field of Classification Search
CPC .... H04L 41/145; H04L 41/0893; H04L 41/16
See application file for complete search history.

(56) References Cited

U.S. PATENT DOCUMENTS

| 6,058,260 A | 5/2000 | Brockel et al. |
| 8,140,589 B2 | 3/2012 | Petri |

(Continued)

FOREIGN PATENT DOCUMENTS

| CN | 102244679 A | 11/2011 |
| CN | 102339390 A | 2/2012 |

(Continued)

OTHER PUBLICATIONS

"Updates of per node-level tunnel model and interim agreement," SA WG2 Meeting #117, Kaohsiung, S2-165655, 8 pages, 3rd Generation Partnership Project, Valbonne, France (Oct. 17-21, 2016).

(Continued)

*Primary Examiner* — Wing F Chan
*Assistant Examiner* — Joseph R Maniwang
(74) *Attorney, Agent, or Firm* — Leydig, Voit & Mayer, Ltd.

(57) ABSTRACT

A model updating method and apparatus, and a system, to resolve a problem of network performance deterioration due to model performance deterioration are described. A first function entity sends a model update policy to a second function entity. The model update policy includes an update condition of a model of a first network element, and the model of the first network element indicates to adjust a parameter of the first network element. When receiving an update request, the first function entity performs a procedure of updating the model of the first network element, where the update request is triggered by the second function entity in accordance with determining, by the second function entity, the model meets the update condition.

23 Claims, 13 Drawing Sheets

(51) Int. Cl.
*H04L 41/0893* (2022.01)
*H04L 41/16* (2022.01)

(56) References Cited

U.S. PATENT DOCUMENTS

| | | | | |
|---|---|---|---|---|
| 2009/0138795 A1* | 5/2009 | Liu | ............ | G06F 9/448 |
| | | | | 715/234 |
| 2017/0310691 A1 | 10/2017 | Vasseur et al. | | |
| 2018/0032908 A1 | 2/2018 | Nagaraju et al. | | |
| 2018/0184232 A1* | 6/2018 | Maitra | ............ | H04W 4/70 |
| 2019/0238487 A1* | 8/2019 | Ciano | ............ | G06N 20/00 |

FOREIGN PATENT DOCUMENTS

| | | |
|---|---|---|
| CN | 102571400 A | 7/2012 |
| CN | 103139008 A | 6/2013 |
| CN | 103502899 A | 1/2014 |
| CN | 106599836 A | 4/2017 |
| GB | 2539977 A | 1/2017 |
| WO | 2016038139 A1 | 3/2016 |
| WO | 2017123674 A1 | 7/2017 |

OTHER PUBLICATIONS

Huawei, HiSillcon, "Discussion on big data and 5G," SA WG2 Meeting #125, Gothenburg, Sweden, S2-181250, total 14 pages, 3rd Generation Partnership Project, Valbonne, France (Jan. 22-26, 2018).

Azuma et al., "An Evaluation of Distributed Cooperative Learning Architecture for Anomaly Detection in Multi-service Shared M2M Area Networks," The Institute of Electronics, Information and Communication Engineers, IEICE Technical Report NS2016-64, vol. 116, No. 146, pp. 75-80 (Jul. 2016). With an English Abstract.

* cited by examiner

MODEL UPDATE METHOD AND APPARATUS, AND SYSTEM

CROSS-REFERENCE TO RELATED APPLICATIONS

This application is a continuation of International Application No. PCT/CN2019/084148, filed on Apr. 24, 2019, which claims priority to Chinese Patent Application No. 201810393730.0, filed on Apr. 27, 2018. The disclosures of the aforementioned applications are hereby incorporated by reference in their entireties.

TECHNICAL FIELD

This application relates to the field of information technologies, and in particular, to a model update method and apparatus, and a system.

BACKGROUND

With development of an artificial intelligence (AI) technology, AI is more widely applied in wireless networks. In an artificial intelligence network architecture, a model generated based on a machine learning technology is used to analyze data generated in a mobile network, and optimize the mobile network based on an analysis result generated by using the model, to better support a user service. This becomes an evolution trend of the mobile network.

During running of the model, performance of the model may deteriorate due to change of a wireless network environment. Consequently, the network cannot run properly. In this case, a model update mechanism is needed to trigger model update in time to ensure model validity. In an existing intelligent network architecture, the model is updated at a fixed time interval, and the model is re-trained in an active manner by using data newly generated by a network element. In this way, the change of the network environment cannot be accurately detected by actively updating the model. During model delivery and running, the network environment may change before a model update time arrives. Consequently, the model is no longer applicable to a current case and an incorrect result is generated. This causes that the network performance deteriorates or the network cannot run.

SUMMARY

This application provides a model update method and apparatus, and a system, to resolve a problem of network performance deterioration due to model performance deterioration in the prior art.

According to a first aspect, an embodiment of this application provides a model update method. The method includes: sending, by a first function entity, a model update policy to a second function entity, where the model update policy includes an update condition of a model of a first network element, and the model of the first network element is used to indicate to adjust a parameter of the first network element; and when receiving an update request, performing, by the first function entity, a procedure of updating the model of the first network element, where the update request is triggered by the second function entity when the second function entity determines that the model meets the update condition.

The first function entity may be an analyzing and modeling function (AMF) entity, and the second function entity may be an adaptive policy function (APF) entity or a model execution function (MEF) entity.

In a model update mechanism in this application, the model update mechanism is changed from active periodic update to passive triggered update. The first function entity configures the model update policy to the second function entity, and the second function entity triggers the update request to the first function entity when detecting that the model meets the update condition. Therefore, when receiving the update request, the first function entity performs the procedure of updating the model. If the update condition is met, it indicates that a network environment changes. In this case, when the network environment changes and the update condition is met, the model is updated in time, thereby avoiding network performance deterioration that may be caused by a manner of actively updating the model or waste of resources. The model update policy can be configured based on a scenario. Therefore, flexibility of the model update policy is relatively high.

In a possible design, the model update policy further includes an index of first data, and the first data is used to determine whether the model meets the update condition.

In a possible design, the first function entity is the analyzing and modeling function AMF entity, and the second function entity is the adaptive policy function (APF) entity; before the performing, by the first function entity, a procedure of updating the model of the first network element, the method further includes: sending, by the AMF entity, the model of the first network element to a model execution function (MEF) entity; and the performing, by the first function entity, a procedure of updating the model includes: sending, by the AMF entity, a data request to a data service function (DSF) entity, where the data request is used to request second data that corresponds to the first network element and that is required for updating the model; receiving, by the AMF entity, the second data that corresponds to the first network element and that is sent by the DSF entity, where the second data includes an output result that is of the model of the first network element and that is determined by the MEF entity and a parameter adjustment action that is of the first network element and that is determined by the APF entity based on the output result; and re-training, by the AMF entity, the model based on the second data, and sending the re-trained model to the MEF.

According to the foregoing design, when the model is updated, the model is trained based on the output result of the model and the parameter adjustment action corresponding to the result of the model, thereby improving accuracy of model training.

In a possible design, a system to which the method is applied includes a plurality of network elements including the first network element, the plurality of network elements all correspond to the model of the first network element, the plurality of network elements are managed by at least two APF entities, the first function entity is an AMF entity, the second function entity is any one of the at least two APF entities, related data of the plurality of network elements is managed by at least two DSF entities, and models respectively corresponding to the plurality of network elements are configured in at least two MEFs; and after the AMF entity separately sends the model update policy to each APF entity, the performing, by the first function entity, a procedure of updating the model includes: determining, by the AMF entity, that a quantity of APF entities that send the update request and that are received in preset duration reaches a preset threshold; separately sending, by the AMF entity, a data request to the at least two DSF entities, where the data request is used to request third data that separately corresponds to the plurality of network elements and that is required for updating the model; receiving, by the AMF entity, the third data that separately corresponds to the plurality of network elements and that is sent by the at least two DSF entities; and re-training, by the AMF entity, the model based on the third data separately corresponding to the plurality of network elements, and separately sending the re-trained model to the at least two MEFs.

According to the foregoing design, when performance of a plurality of models deteriorates and the update condition is met, that is, a plurality of APFs request data to update the models, the AMF re-trains the models based on the data of the plurality of network elements, thereby improving accuracy of model training. In addition, because there is no need to separately train the models for each network element, in this way, resources are saved.

In a possible design, the first function entity is the AMF entity, and the second function entity is the MEF entity; The method may further includes: sending, by the AMF entity, the model of the first network element to the MEF entity; and the performing, by the first function entity, a procedure of updating the model of the first network element includes: sending, by the AMF entity, a data request to a DSF entity, where the data request is used to request fourth data that corresponds to the first network element and that is required for updating the model of the first network element; receiving, by the AMF entity, the fourth data sent by the DSF entity, where the fourth data includes an output result that is of the model of the first network element and that is determined by the MEF entity, data that generates the output result, and a parameter adjustment action that is of the first network element and that corresponds to the output result; and re-training, by the AMF entity, the model of the first network element based on the fourth data, and sending the re-trained model to the MEF.

In the foregoing design, the MEF triggers model update. The AMF configures the model update policy for the MEF, so that the MEF triggers the model update when determining, based on the model update policy, that the update condition is met. During model training, the model is re-trained based on the output result of the model that is not updated and the parameter adjustment action corresponding to the output result, thereby improving accuracy of model training.

According to a second aspect, an embodiment of this application provides a model update method. The method includes: receiving, by a second function entity, a model update policy sent by a first function entity, where the model update policy includes an update condition of a model, and the model is used to indicate to adjust a parameter of a network element; determining, by the second function entity based on the model update policy, whether the model meets the update condition; and sending, by the second function entity, an update request to the first function entity when determining that the model meets the update condition, where the update request is used to trigger the first function entity to perform a procedure of updating the model.

According to the foregoing solution, in a model update mechanism in this application, the model update mechanism is changed from active periodic update to passive triggered update. The first function entity configures the model update policy to the second function entity, and the second function entity triggers the update request to the first function entity when detecting that the model meets the update condition. Therefore, when receiving the update request, the first function entity performs the procedure of updating the model. If the update condition is met, it indicates that a network environment changes. In this case, when the network environment changes and the update condition is met, the model is updated in time, thereby avoiding network performance deterioration that may be caused by a manner of actively updating the model or waste of resources. The model update policy can be configured based on a scenario. Therefore, flexibility of the model update policy is relatively high.

In a possible design, the first function entity is an analyzing and modeling function AMF entity, and the second function entity is an adaptive policy function (APF) entity; the model update policy further includes an index of first data, and the first data is used to determine whether the model meets the update condition; before the determining, by the second function entity, that the model meets the update condition, the method further includes: sending, by the APF entity, a data request to a data service function (DSF) entity, where the data request includes the index of the first data; and receiving, by the APF entity, the first data sent by the DSF entity based on the index of the first data; and the determining, by the second function entity, whether the model meets the update condition includes: determining, by the APF entity based on the first data, whether the model meets the update condition.

In the foregoing design, the APF subscribes to data from the DSF to determine a network environment status. If performance of the model does not deteriorate, the model does not need to be updated. In this way, a computing resource for training the model is saved and a model transmission process is omitted. If network performance deteriorates, the APF sends the update request to trigger the AMF to re-train the model, to update the model.

In a possible design, the method further includes: receiving, by the APF entity, an output result of the model that is sent by a model execution function (MEF) entity; determining, by the APF entity, a parameter adjustment action of the network element based on the output result; and sending, by the APF entity, the determined parameter adjustment action of the network element to the network element, to indicate the network element to adjust the parameter of the network element based on the parameter adjustment action.

In a possible design, the method further includes: sending, by the APF entity to the DSF entity, the output result and the parameter adjustment action that is of the network element and that corresponds to the output result, so that the DSF entity marks data that generates the output result, to update the model.

In a possible design, the first function entity is the analyzing and modeling function AMF entity, and the second function entity is the model execution function (MEF) entity; the model update policy further includes an index of first data, and the first data is used to determine whether the model meets the update condition; before the determining, by the second function entity, whether the model meets the update condition, the method further includes: sending, by the MEF entity, a first data request to a data service function (DSF) entity, where the first data request includes the index of the first data; and receiving, by the MEF entity, the first data that is determined based on the index of the first data and that is sent by the DSF entity; and the determining, by the second function entity, whether the model meets the update condition includes: determining, by the MEF entity based on the first data, whether the model meets the update condition.

In the foregoing design, the MEF subscribes to data from the DSF to determine a network environment status. If performance of the model does not deteriorate, the model does not need to be updated. In this way, a computing resource for training the model is saved and a model transmission process is omitted. If network performance deteriorates, the MEF sends the update request to trigger the AMF to re-train the model, to update the model.

In a possible design, the method further includes: receiving, by the MEF, the model sent by the AMF; sending, by the MEF entity, a second data request to the DSF entity, where the second data request includes an index of second data used to represent a current network environment status of the network element; receiving, by the MEF entity, the second data that is determined based on the index of the second data and that is sent by the DSF entity; inputting, by the MEF entity, the second data into the model to obtain an output result, where the result includes a parameter adjustment action of the network element in the current network environment status; and sending, by the MEF entity, the output result to the APF entity.

According to a third aspect, an embodiment of this application provides a model update method. The method includes: receiving, by a data service function (DSF) entity, a data request sent by a first function entity, where the data request includes an index of first data, the first data is used to determine whether a model that is run by a model execution function (MEF) meets an update condition, and the model is used to indicate to adjust a parameter of a network element; and sending, by the DSF entity, the first data to the first function entity based on the index of the first data, where the first function entity is an adaptive policy function (APF) entity or the MEF entity.

According to the foregoing design, the first function entity subscribes to the first data from the DSP, to monitor, based on the subscribed first data, whether the model meets the update condition, to trigger update when determining that the update condition is met.

In a possible design, when the first function entity is the adaptive policy function (APF) entity, the method further includes: receiving, by the DSF entity, an output result of the model that is sent by the APF entity and a parameter adjustment action that is of the network element and that corresponds to the output result; and marking, by the DSF, data that generates the output result, to update the model.

In a possible design, the method further includes: receiving, by the DSF entity, a data request sent by an analyzing and modeling function AMF entity, where the data request is used to request second data that is required for updating the model; and sending, by the DSF entity to the AMF entity, the second data that is required for updating the model, where the second data includes the output result, the data that generates the output result, and the parameter adjustment action that is of the network element and that corresponds to the output result.

According to the foregoing design, when the APF triggers model update, the APF sends the output result of the model and the parameter adjustment action corresponding to the output result to the DSF, so that the DSF marks the data. When the model needs to be updated, the AMF relatively accurately updates the model based on the data.

According to a fourth aspect, an embodiment of this application provides a model update apparatus. The apparatus may be applied to a first function entity, or the apparatus may be the first function entity, or may be a chip that can implement a function corresponding to the first function entity. The apparatus has a function of implementing the embodiments of the first aspect. The function may be implemented by hardware, or may be implemented by hardware executing corresponding software. The hardware or the software includes one or more modules corresponding to the foregoing function.

Specifically, the first function entity includes the following modules: a sending module, configured to: send a model update policy to a second function entity, where the model update policy includes an update condition of a model of a first network element, and the model of the first network element is used to indicate to adjust a parameter of the first network element; a receiving module, configured to receive an update request, where the update request is triggered by the second function entity when the second function entity determines that the model meets the update condition; and a processing module, configured to: when the receiving module receives the update request, perform a procedure of updating the model of the first network element.

In a possible design, the model update policy further includes an index of first data, and the first data is used to determine whether the model meets the update condition.

In a possible design, the first function entity is an analyzing and modeling function AMF entity, and the second function entity is an adaptive policy function (APF) entity; the sending module sends the model of the first network element to a model execution function (MEF) entity before the processing module performs the procedure of updating the model of the first network element; when the receiving module receives the update request, the sending module is further configured to send a data request to a data service function (DSF) entity, where the data request is used to request second data that corresponds to the first network element and that is required for updating the model; the receiving module is further configured to receive second data that corresponds to the first network element and that is sent by the DSF entity, where the second data includes an output result that is of the model of the first network element and that is determined by the MEF entity and a parameter adjustment action that is of the first network element and that is determined by the APF entity based on the output result; and the processing module is specifically configured to: re-train the model based on the second data, and send the re-trained model to the MEF.

In a possible design, a system to which the method is applied includes a plurality of network elements including the first network element, the plurality of network elements all correspond to the model of the first network element, the plurality of network elements are managed by at least two APF entities, the first function entity is an AMF entity, the second function entity is any one of the at least two APF entities, related data of the plurality of network elements is managed by at least two DSF entities, and models respectively corresponding to the plurality of network elements are configured in at least two MEFs; and after the sending module separately sends the model update policy to each APF entity, when performing the procedure of updating the model, the processing module determines that a quantity of APF entities that send the update request and that are received by the receiving module in preset duration reaches a preset threshold; the sending module is configured to separately send a data request to the at least two DSF entities, where the data request is used to request third data that separately corresponds to the plurality of network elements and that is required for updating the model; the receiving module is configured to receive the third data that separately corresponds to the plurality of network elements and that is sent by the at least two DSF entities; and the processing module is configured to re-train the model based on the third data separately corresponding to the plurality of network elements, and separately send the re-trained model to the at least two MEFs.

In a possible design, the first function entity is the AMF entity, and the second function entity is the MEF entity; the sending module is further configured to send the model of the first network element to the MEF entity; the processing module is further configured to: when the receiving module receives the update request, trigger the sending module to send a data request to a DSF entity, where the data request is used to request fourth data that corresponds to the first network element and that is required for updating the model of the first network element; the receiving module is further configured to receive the fourth data sent by the DSF entity, where the fourth data includes an output result that is of the model of the first network element and that is determined by the MEF entity, data that generates the output result, and a parameter adjustment action that is of the first network element and that corresponds to the output result; and the processing module is further configured to: re-train the model of the first network element based on the fourth data, and send the re-trained model to the MEF.

According to a fifth aspect, an embodiment of this application provides an apparatus. The apparatus is applied to a first function entity and includes a processor and a communications interface, and the apparatus may further include a memory. The memory is configured to store an instruction. When the apparatus runs, the communications interface is configured to send and receive data, and the processor executes the instruction stored in the memory, so that the apparatus performs the model update method according to any one of the first aspect or the implementations of the first aspect. It should be noted that the memory may be integrated into the processor, or may be independent of the processor.

Specifically, the communications interface is configured to: send a model update policy to a second function entity, where the model update policy includes an update condition of a model of a first network element, and the model of the first network element is used to indicate to adjust a parameter of the first network element; and receive an update request, where the update request is triggered by the second function entity when the second function entity determines that the model meets the update condition; and the processor is configured to: when receiving the update request through the communications interface, perform a procedure of updating the model of the first network element.

In a possible design, the model update policy further includes an index of first data, and the first data is used to determine whether the model meets the update condition.

In a possible design, the first function entity is an analyzing and modeling function AMF entity, and the second function entity is an adaptive policy function (APF) entity; the communications interface is further configured to: before the processor performs the procedure of updating the model of the first network element, send the model of the first network element to a model execution function (MEF) entity; and when performing the procedure of updating the model of the first network element, the processor is specifically configured to: send a data request to a data service function (DSF) entity through the communications interface, where the data request is used to request second data that corresponds to the first network element and that is required for updating the model; receive, through the communications interface, the second data that corresponds to the first network element and that is sent by the DSF entity, where the second data includes an output result that is of the model of the first network element and that is determined by the MEF entity and a parameter adjustment action that is of the first network element and that is determined by the APF entity based on the output result; and re-train the model based on the second data, and send the re-trained model to the MEF.

In a possible design, a system to which the method is applied includes a plurality of network elements including the first network element, the plurality of network elements all correspond to the model of the first network element, the plurality of network elements are managed by at least two APF entities, the first function entity is an AMF entity, the second function entity is any one of the at least two APF entities, related data of the plurality of network elements is managed by at least two DSF entities, and models respectively corresponding to the plurality of network elements are configured in at least two MEFs; and the processor is configured to: after separately sending the model update policy to each APF entity through the communications interface, when performing the procedure of updating the model, determine that a quantity of APF entities that send the update request and that are received in preset duration reaches a preset threshold; separately send a data request to the at least two DSF entities through the communications interface, where the data request is used to request third data that separately corresponds to the plurality of network elements and that is required for updating the model; receive, through the communications interface, the third data that separately corresponds to the plurality of network elements and that is sent by the at least two DSF entities; and re-train the model based on the third data separately corresponding to the plurality of network elements, and separately send the re-trained model to the at least two MEFs.

In a possible design, the first function entity is the AMF entity, and the second function entity is the MEF entity; the communications interface is further configured to send the model of the first network element to the MEF entity; and when performing the procedure of updating the model of the first network element, the processor is specifically configured to: send a data request to a DSF entity through the communications interface, where the data request is used to request fourth data that corresponds to the first network element and that is required for updating the model of the first network element; receive the fourth data sent by the DSF entity through the communications interface, where the fourth data includes an output result that is of the model of the first network element and that is determined by the MEF entity, data that generates the output result, and a parameter adjustment action that is of the first network element and that corresponds to the output result; and re-train the model of the first network element based on the fourth data, and send the re-trained model to the MEF.

According to a sixth aspect, an embodiment of this application provides a model update apparatus. The apparatus is applied to a second function entity, and the apparatus may be the second function entity, or may be a chip that can implement a function corresponding to the second function entity. The apparatus has a function of implementing the embodiments of the second aspect. The function may be implemented by hardware, or may be implemented by hardware executing corresponding software. The hardware or the software includes one or more modules corresponding to the foregoing function. The second function entity may be an APF entity or an MEF entity.

Specifically, the second function entity includes: a receiving module, configured to receive a model update policy sent by a first function entity, where the model update policy includes an update condition of a model, and the model is used to indicate to adjust a parameter of a network element; a processing module, configured to determine, based on the model update policy, whether the model meets the update condition; and a sending module, configured to send an update request to the first function entity when the processing module determines that the model meets the update condition, where the update request is used to trigger the first function entity to perform a procedure of updating the model.

In a possible design, the first function entity is an analyzing and modeling function AMF entity, and the second function entity is an adaptive policy function (APF) entity; and the model update policy further includes an index of first data, and the first data is used to determine whether the model meets the update condition; the sending module in the APF entity is further configured to: before the processing module in the APF determines that the model meets the update condition, send a data request to a data service function (DSF) entity, where the data request includes the index of the first data; and the receiving module in the APF entity is further configured to receive the first data sent by the DSF entity based on the index of the first data; and when determining whether the model meets the update condition, the processing module in the APF entity is specifically configured to determine, based on the first data, whether the model meets the update condition.

In a possible design, the receiving module in the APF entity is further configured to receive an output result of the model that is sent by a model execution function (MEF) entity; the processing module in the APF entity is further configured to determine a parameter adjustment action of the network element based on the output result; and the sending module in the APF entity is further configured to send the determined parameter adjustment action of the network element to the network element, to indicate the network element to adjust the parameter of the network element based on the parameter adjustment action.

In a possible design, the sending module in the APF entity is further configured to send, to the DSF entity, the output result and the parameter adjustment action that is of the network element and that corresponds to the output result, so that the DSF entity marks data that generates the output result, to update the model.

In a possible design, the first function entity is the analyzing and modeling function AMF entity, and the second function entity is the model execution function (MEF) entity; the model update policy further includes an index of first data, and the first data is used to determine whether the model meets the update condition; the sending module in the MEF is further configured to: before the processing module determines whether the model meets the update condition, send a first data request to a data service function (DSF) entity, where the first data request includes the index of the first data; the receiving module in the MEF entity is further configured to receive the first data that is determined based on the index of the first data and that is sent by the DSF entity; and when determining whether the model meets the update condition, the processing module in the MEF entity is specifically configured to determine, based on the first data, whether the model meets the update condition.

In a possible design, the receiving module in the MEF is further configured to receive the model sent by the AMF; the sending module in the MEF entity is further configured to send a second data request to the DSF entity, where the second data request includes an index of second data used to represent a current network environment status of the network element; the receiving module in the MEF entity is further configured to receive the second data that is determined based on the index of the second data and that is sent by the DSF entity; the processing module in the MEF entity is further configured to input the second data into the model to obtain an output result, where the result includes a parameter adjustment action of the network element in the current network environment status; and the sending module in the MEF entity is further configured to send the output result to the APF entity.

According to a seventh aspect, an embodiment of this application provides an apparatus. The apparatus is applied to a second function entity and includes a processor and a communications interface, and the apparatus may further include a memory. The memory is configured to store an instruction. When the apparatus runs, the communications interface is configured to send and receive data, and the processor executes the instruction stored in the memory, so that the apparatus performs the model update method according to any one of the second aspect or the implementations of the second aspect. It should be noted that the memory may be integrated into the processor, or may be independent of the processor.

Specifically, the communications interface is configured to receive a model update policy sent by a first function entity, where the model update policy includes an update condition of a model, and the model is used to indicate to adjust a parameter of a network element; and the processor is configured to: determine, based on the model update policy, whether the model meets the update condition; and send an update request to the first function entity through the communications interface when determining that the model meets the update condition, where the update request is used to trigger the first function entity to perform a procedure of updating the model.

In a possible design, the first function entity is an analyzing and modeling function AMF entity, and the second function entity is an adaptive policy function (APF) entity; and the model update policy further includes an index of first data, and the first data is used to determine whether the model meets the update condition; the processor in the APF entity is further configured to: before determining whether the model meets the update condition, send a data request to a data service function (DSF) entity through the communications interface, where the data request includes the index of the first data; and receive, through the communications interface in the APF entity, the first data sent by the DSF entity based on the index of the first data; and when determining whether the model meets the update condition, the processor in the APF entity is specifically configured to determine, based on the first data, whether the model meets the update condition.

In a possible design, the communications interface in the APF entity is further configured to receive an output result of the model that is sent by a model execution function (MEF) entity; the processor in the APF entity is further configured to determine a parameter adjustment action of the network element based on the output result; and the communications interface in the APF entity is further configured to send the determined parameter adjustment action of the network element to the network element, to indicate the network element to adjust the parameter of the network element based on the parameter adjustment action.

In a possible design, the communications interface in the APF entity is further configured to send, to the DSF entity, the output result and the parameter adjustment action that is of the network element and that corresponds to the output result, so that the DSF entity marks data that generates the output result, to update the model.

In a possible design, the first function entity is the analyzing and modeling function AMF entity, and the second function entity is the model execution function (MEF) entity; the model update policy further includes an index of first data, and the first data is used to determine whether the model meets the update condition; the processor in the MEF is further configured to: before determining whether the model meets the update condition, send a first data request to a data service function (DSF) entity through the communications interface in the MEF, where the first data request includes the index of the first data; and receive, through the communications interface in the MEF, the first data that is determined based on the index of the first data and that is sent by the DSF entity; and when determining whether the model meets the update condition, the processor in the MEF is specifically configured to determine, based on the first data, whether the model meets the update condition.

In a possible design, the communications interface in the MEF is further configured to: receive the model sent by the AMF; send a second data request to the DSF entity, where the second data request includes an index of second data used to represent a current network environment status of the network element; and receive the second data that is determined based on the index of the second data and that is sent by the DSF entity; the processor in the MEF is further configured to input the second data into the model to obtain an output result, where the result includes a parameter adjustment action of the network element in the current network environment status; and the communications interface in the MEF is further configured to send the output result to the APF entity.

According to an eighth aspect, an embodiment of this application provides a model update apparatus. The apparatus is applied to a data service function (DSF) entity, and the apparatus may be a DSF, or may be a chip that can implement a function corresponding to the DSF. The apparatus has a function of implementing the embodiments of the third aspect. The function may be implemented by hardware, or may be implemented by hardware executing corresponding software. The hardware or the software includes one or more modules corresponding to the foregoing function.

A receiving module is configured to receive a data request sent by a first function entity, where the data request includes an index of first data, the first data is used to determine whether a model that is run by a model execution function (MEF) meets an update condition, and the model is used to indicate to adjust a parameter of a network element; a processing module is configured to determine first data based on the index of the first data; and a sending module is configured to send the first data determined by the processing module to the first function entity, where the first function entity is an adaptive policy function (APF) entity or the MEF entity.

In a possible design, when the first function entity is the adaptive policy function (APF) entity, the receiving module is further configured to receive an output result of the model that is sent by the APF entity and a parameter adjustment action that is of the network element and that corresponds to the output result; and the processing module is further configured to mark data that generates the output result, to update the model.

In a possible design, the receiving module is further configured to receive a data request sent by an analyzing and modeling function AMF entity, where the data request is used to request second data that is required for updating the model; and the sending module is further configured to send, to the AMF entity, the second data that is required for updating the model, where the second data includes the output result, the data that generates the output result, and the parameter adjustment action that is of the network element and that corresponds to the output result.

According to a ninth aspect, an embodiment of this application provides an apparatus. The apparatus is applied to a DSF entity and includes a processor and a communications interface, and the apparatus may further include a memory. The memory is configured to store an instruction. When the apparatus runs, the communications interface is configured to send and receive data, and the processor executes the instruction stored in the memory, so that the apparatus performs the model update method according to any one of the third aspect or the implementations of the third aspect. It should be noted that the memory may be integrated into the processor, or may be independent of the processor.

Specifically, the DSF entity includes: the communications interface, configured to receive a data request sent by a first function entity, where the data request includes an index of first data, the first data is used to determine whether a model that is run by a model execution function (MEF) meets an update condition, and the model is used to indicate to adjust a parameter of a network element; and the processor, configured to: obtain the index of the first data in the data request, and determine the first data based on the index of the first data, where the communications interface is further configured to send the first data to the first function entity, and the first function entity is an adaptive policy function (APF) entity or the MEF entity.

In a possible design, when the first function entity is the adaptive policy function (APF) entity, the communications interface is further configured to receive an output result of the model that is sent by the APF entity and a parameter adjustment action that is of the network element and that corresponds to the output result; and the processor is further configured to mark data that generates the output result, to update the model.

In a possible design, the communications interface is further configured to receive a data request sent by an analyzing and modeling function AMF entity, where the data request is used to request second data that is required for updating the model; and the processor is further configured to: determine the second data based on the data request, and send the second data to the AMF entity through the communications interface, where the second data includes the output result, the data that generates the output result, and the parameter adjustment action that is of the network element and that corresponds to the output result.

According to a tenth aspect, an embodiment of this application provides a system. The system includes: an analyzing and modeling function AMF entity and an adaptive policy function (APF) entity, where the AMF entity is configured to send a model update policy to the APF entity, where the model update policy includes an update condition of a model of a network element, and the model is used to indicate to adjust a parameter of the network element; the APF entity is configured to: receive the model update policy sent by the AMF entity, and send an update request to the AMF entity when determining that the model meets the update condition that is included in the model update policy, where the update request is used to trigger the AMF entity to perform a procedure of updating the model; and the AMF entity is configured to: when receiving the update request, perform the procedure of updating the model.

Specifically, the AMF entity is configured to implement the method procedure performed by the first function entity according to any design of the first aspect. The APF entity is configured to implement the method procedure performed by the APF entity according to any design of the second aspect. The system may further include a DSP entity, configured to perform the method procedure performed by the DSF entity according to any design of the third aspect. In a possible design, the system may further include another device that interacts with the two function entities in the solution provided in this embodiment of this application, for example, a network element and an MEF entity.

According to an eleventh aspect, an embodiment of this application provides another system. The system includes: an analyzing and modeling function AMF entity and a model execution function (MEF) entity, where the AMF entity is configured to send a model update policy to the MEF entity, where the model update policy includes an update condition of a model of a network element, and the model is used to indicate to adjust a parameter of the network element; the MEF entity is configured to: receive the model update policy sent by the AMF entity, and send an update request to the AMF entity when determining that the model meets the update condition that is included in the model update policy, where the update request is used to trigger the AMF entity to perform a procedure of updating the model; and the AMF entity is configured to: when receiving the update request sent by the MEF entity, perform the procedure of updating the model.

Specifically, the AMF entity is configured to implement the method procedure performed by the first function entity according to any design of the first aspect. The MEF entity is configured to implement the method procedure performed by the APF entity according to any design of the second aspect. The system may further include a DSP entity, configured to perform the method procedure performed by the DSF entity according to any design of the third aspect. In a possible design, the system may further include another device that interacts with the two function entities in the solution provided in this embodiment of this application, for example, a network element and an APF entity.

According to a twelfth aspect, an embodiment of this application further provides a readable storage medium. The readable storage medium stores a program or an instruction. When the program or the instruction is run on a computer, any network element selection method according to the foregoing aspects is performed.

According to a thirteenth aspect, an embodiment of this application further provides a computer program product including an instruction. When the computer program product is run on a computer, the computer is enabled to perform any network element selection method according to the foregoing aspects.

In addition, for technical effects brought by any design manner according to the fourth aspect to the thirteenth aspect, refer to technical effects brought by different implementations according to the first aspect to the third aspect. Details are not described herein again.

DESCRIPTION OF EMBODIMENTS

Figure 1:
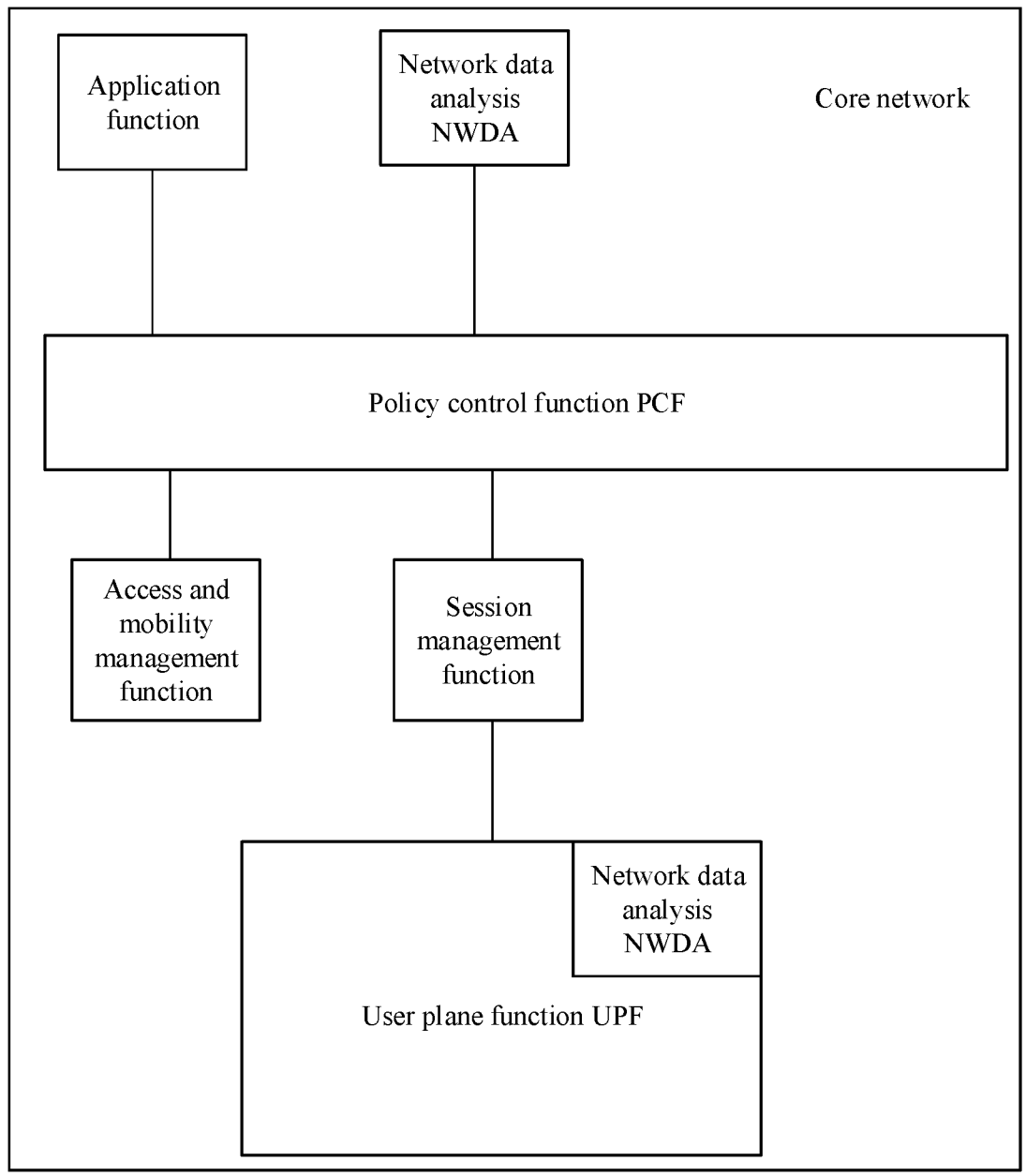
FIG. 1 is a schematic diagram of an architecture of a core network according to an embodiment of this application.

The following describes in detail illustrative embodiments of this application with reference to accompanying drawings.

A model update method provided in the embodiments of this application is applicable to communications systems using different radio access technologies, for example, a $3^{rd}$ generation (3G) communications system, a long term evolution (LTE) system, a $5^{th}$ generation (5G) communications system, or more possible communications systems in the future.

An access network is responsible for access of a terminal on a wireless side. Possible deployment modes of an access network (AN) device includes: separate deployment of a centralized unit (CU) and a distributed unit (DU), and deployment of a single site. A single site includes a gNB/NR-NB, a transmission reception point (TRP), an evolved NodeB (eNB), a radio network controller (RNC), a NodeB (NB), a base station controller (BSC), a base transceiver station (BTS), a home base station (e.g., a home evolved NodeB or a home Node B, HNB), a baseband unit (BBU), a wireless fidelity (Wifi) access point (AP), or the like. In a 5G communications system, the single site is the gNB/NR-NB. A CU supports protocols such as a radio resource control (RRC) protocol, a packet data convergence protocol (PDCP), and a service data adaptation protocol (SDAP). The CU is usually deployed on a central node and has abundant computing resources. A DU mainly supports a radio link control (RLC) layer protocol, a media access control (MAC) layer protocol, and a physical layer (PHY) protocol. The DU is usually deployed in a distributed manner. Usually, one CU is connected to more than one DU. The gNB has functions of the CU and the DU and is usually deployed as a single site. The DU and the gNB usually have limited computing resources due to factors such as a limited device size and power consumption.

An operation support system (OSS) of the access network is mainly configured to: configure a parameter of a terminal device, and collect information data such as an alarm, performance statistics, a running status, and a log of the terminal device. The terminal device is also be referred to as user equipment (UE), a mobile station (MS), a mobile terminal (MT), or the like, and is a device that provides a user with voice and/or data connectivity. For example, the terminal device includes a handheld device, a vehicle-mounted device, or the like that has a wireless connection function. Currently, the terminal device may be a mobile phone, a tablet, a notebook computer, a palmtop computer, a mobile interne device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, or the like.

A mobile core network includes entities such as an access and mobility management function entity, a session management function (SMF) entity, a user plane function (UPF) entity, a policy control function (PCF) entity, and an application function entity, and is usually deployed on a cloud computing system in a centralized manner and is connected to the access network through a transmission network.

The model update method provided in the embodiments of this application may be implemented through a data analysis (DA) network architecture configured in a wireless network. The DA network architecture may be configured in the core network, or may be configured in the radio access network. In an example, when the DA network architecture is configured in the core network, the DA network architecture may be referred to as an NWDA (network data analysis). When the DA network architecture is configured in the radio access network, the DA network architecture may be referred to as a RANDA (radio access network data analysis). When the DA is deployed in the CU, the DA may be referred to as a CUDA. When the DA is deployed in the DU, the DA may be referred to as a DUDA. When the DA is deployed in the gNB, the DA may be referred to as a gNBDA.

Referring to FIG. 1, the NWDA is introduced into a core network. The NWDA is configured to: collect network data from function entities of core networks, train a data analysis and evaluation model ("model" for short), implement data analysis and prediction, and provide a data analysis result for a PCF. In this way, the PCF may make a decision based on the data analysis result and a current service of a user, generate a new policy and charging control (PCC) rule, and improve quality of service (QoS) of a user service, thereby improving use experience of the user service.

Figure 2:
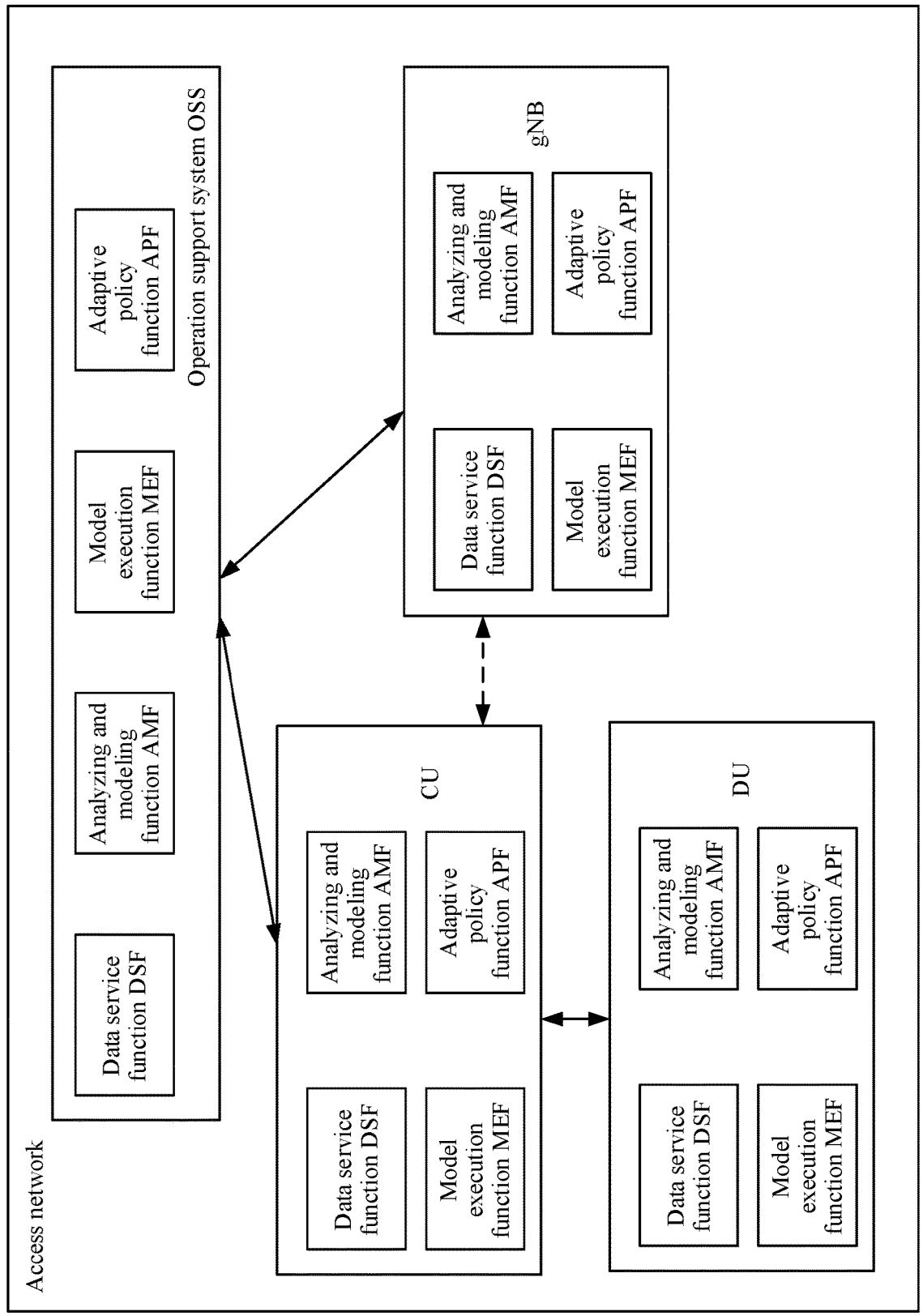
FIG. 2 is a schematic diagram of an architecture of an access network according to an embodiment of this application.

The DA may include four function entities. The four function entities are a data service function (DSF) entity, an analyzing and modeling function (AMF) entity, a model execution function (MEF) entity, and an adaptive policy function (APF) entity. FIG. 2 is a schematic diagram of an architecture in which the DA is deployed in an access network.

In the embodiments of this application, through signaling exchange among the foregoing four function entities, a model is updated. A parameter adjustment action of a network element (net element, NE) is determined based on the updated model, and the parameter adjustment action of the network element is sent to the network element that performs the action, to evaluate whether the model needs to be updated based on change of a network environment status after the network element performs the parameter adjustment action, and determine a next parameter adjustment action of the network element by using an updated evaluation model.

The following describes functions performed by the foregoing four function entities when the model is updated.

The DSF is configured to: collect data, preprocess the collected data, provide the AMF with data needed for training or updating the evaluation model, and provide the MEF with network data needed for executing the evaluation model. In the descriptions of the embodiments of this application, the network data may also be referred to as data for short.

The AMF is configured to: subscribe to, from the DSF, the data needed for training or updating the evaluation model, train or update the evaluation model based on the data that is subscribed to, and send the evaluation model to the MEF. In addition, the AMF is configured to: after receiving the parameter adjustment action of the network element that is fed back by the APF, iteratively update the evaluation model based on the parameter adjustment action of the network element, and send the evaluation model obtained after the update to the MEF or the APF. The MEF is configured to: obtain the evaluation model from the AMF, obtain the network data from the DSF, predict the network data online by using the evaluation model, obtain the parameter adjustment action of the network element, and send the parameter adjustment action of the network element to the APF.

The APF is configured to trigger a policy (e.g., a conflict processing policy) based on an analysis result or a prediction result, to change a network status, for example, the APF can implement parameter adjustment, traffic engineering, or resource scheduling. The APF is specifically configured to: obtain the parameter adjustment action of the network element from the MEF, and send the parameter adjustment action of the network element to the network element that actually performs the parameter adjustment action of the network element, to improve a capacity or performance of the network element. In addition, the APF is configured to feed back the parameter adjustment action of the network element to the AMF.

Figure 3:
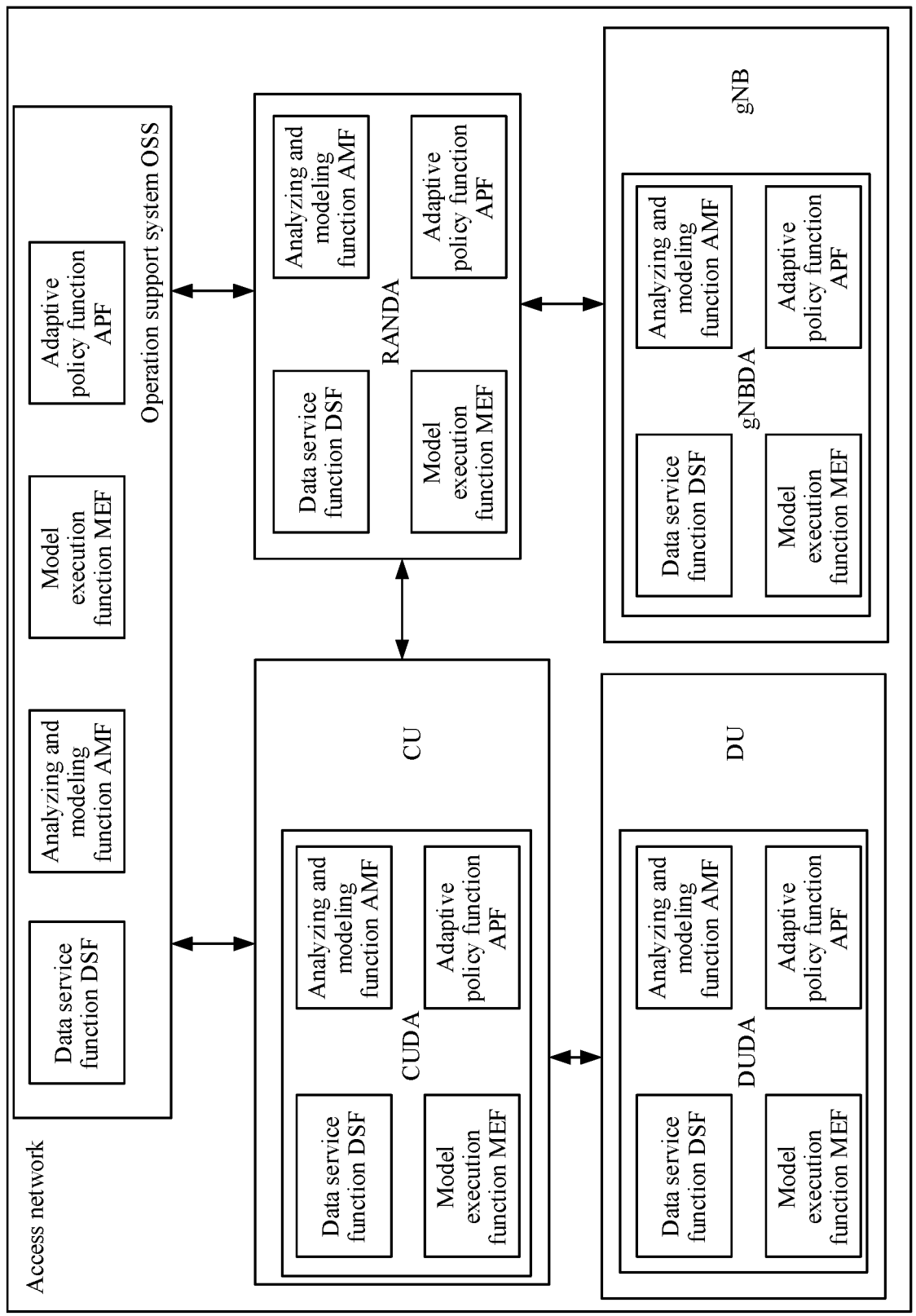
FIG. 3 is a schematic diagram of a network architecture according to an embodiment of this application.

The foregoing four function entities may be deployed in an access network or deployed on a network element in a core network. For example, the four function entities may be deployed on a CU, a DU, a gNB, and an OSS in the access network, or may be deployed on a UPF, or may be deployed as a whole in the core network and connected to a PCF. The foregoing four function entities may be further deployed in the access network to manage the entire access network, and then the foregoing four function entities are separately deployed in each local network element. Referring to FIG. 3, the DA is deployed in a RAN and is referred to as a RANDA, and the DA is separately deployed in the CU, the DU, and the gNB are referred to as the CUDA, the DUDA, and the gNBDA. Specifically, during deployment, the foregoing four function entities may be deployed in a same network element, or may be deployed in different network elements in a distributed manner. In other words, in some application scenarios, the four function entities in a same network element exchange signaling to complete the model update method in the embodiments of this application; and in some other application scenarios, the function entities deployed in different network elements exchange signaling through interfaces between the network elements, to complete the model update method in the embodiments of this application. For example, for some parameters with a high requirement for realtime, since computing resources of the DU are limited, the evaluation model may be trained or updated by the AMF entity in the CU, and the evaluation model obtained after training or update is executed by the MEF entity in the DU. For another example, when a same model in the entire access network needs to be updated, the evaluation model may be trained or updated by the DA (which may be specifically the AMF in the RANDA) in the RAN that is deployed globally, and the trained or updated evaluation model is executed by the DA (which may be specifically the MEF) in the DU, the CU, or the gNB that is deployed locally.

It should be noted that names of the foregoing four function entities are not limited in this application. A person skilled in the art changes the names of the foregoing function entities to other names but the entities still perform the same functions. This still falls within the protection scope of this application.

Parameters of the network element in the embodiments of this application may be various parameters in radio resource management (RRM), various parameters in a radio transmission technology (RTT), or various parameters in an operation and maintenance system. For example, the parameters of the network element may be: a pilot power, a reference signal (RS) power, an antenna downtilt, a long term evolution (LTE) reusable level difference threshold, or a measurement report (MR) interference decision threshold.

In an existing intelligent network architecture, after a model is delivered to a running network element, a manner of actively updating the model is generally used. For example, if an update period is fixed, a model update time (e.g., one week, one day, or one hour) is set when the model is configured. After the model is deployed, the entity deploying the model starts to record a running time. When the update period arrives, data generated during this period is used to train a new model and deploy the model after training. In this way, the change of the network environment cannot be accurately detected by actively updating the model. During model deployment and running, the network environment may change before the update time arrives. Consequently, the model is no longer applicable to a current case and an incorrect result is generated. This causes that the network performance deteriorates or the network cannot run.

On the other hand, if the network environment does not change within the update period after the model is deployed and running, and a model running effect is good, actively training a new model for update occupies an additional computing capability such as a DA, a NodeB, a CU, a DU, and a UPF. When a plurality of model update tasks are carried in an intelligent network architecture, additional consumption is caused. In the intelligent network architecture (e.g., the RANDA), the model may be deployed at a location near an application network element, and all distributed network elements need to be updated in each period. In this case, network transmission resources are wasted for transmitting a large quantity of models. In conclusion, the change of the network environment cannot be flexibly configured and detected by actively updating the model update. This occupies additional computing resources and bandwidth.

Based on this, this application provides a model update method and apparatus, to resolve an existing problem that flexibility of updating a model is relatively low. The method and the apparatus are based on a same inventive concept. Because a problem-resolving principle of the method is similar to that of the apparatus, implementations of the apparatus and the method may mutually refer to each other, and details of repeated parts are not described.

Figure 4:
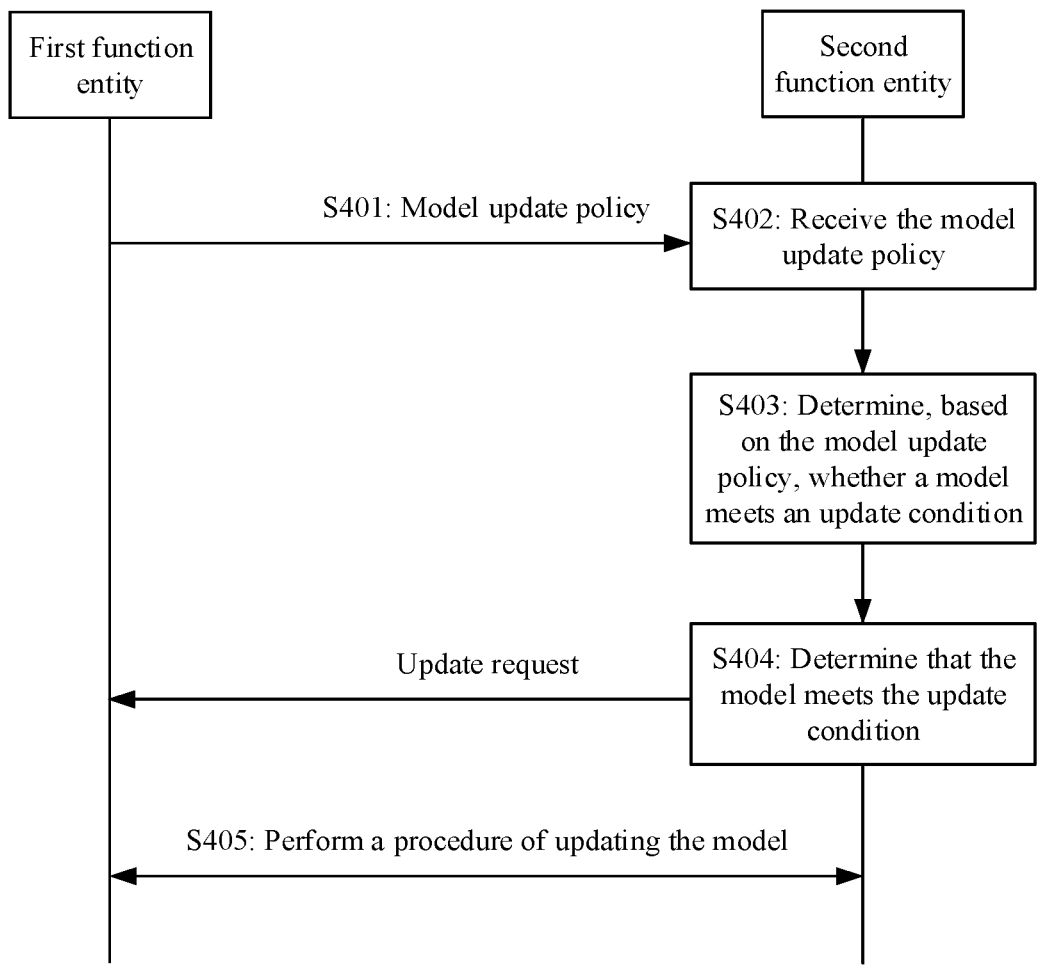
FIG. 4 is a flowchart of a model update method according to an embodiment of this application.

FIG. 4 is a schematic diagram of a procedure of a model update method according to an embodiment of this application.

S401: A first function entity sends a model update policy to a second function entity.

The model update policy includes an update condition of a model of a first network element, and the model is used to indicate to adjust a parameter of the first network element.

In different network environment statuses, the model indicates to adjust the parameter of the first network element differently.

S402: The second function entity receives the model update policy sent by the first function entity.

S403: The second function entity determines, based on the model update policy, whether the model meets the update condition.

S404: The second function entity sends an update request to the first function entity when determining that the model meets the update condition, where the update request is used to trigger the first function entity to perform a procedure of updating the model.

S405: When receiving the update request sent by the second function entity, the first function entity performs the procedure of updating the model of the first network element.

In a possible implementation, the first function entity may be a CUDA configured in a CU, and the second function entity may be a DUDA configured in a DU; or the first function entity may be a RANDA configured in a RAN, and the second function entity may be a DA configured in a CU/a DU/a gNB; or the first function entity may be an OSSDA configured in an OSS, and the second function entity may be a DA configured in a CU/a DU/a gNB.

In a possible implementation, the first function entity may be an AMF entity, and the second function entity may be an APF entity. In other words, the APF entity triggers update. The AMF entity and the APF entity may be located in a same network element, or may be located in different network elements. For example, both the AMF entity and the APF entity are on the CUDA. For another example, the AMF entity is located on the CUDA, and the APF entity is located on the DUDA. For another example, the AMF entity is located on the RANDA, and the APF entity is located on a gNBDA.

Specifically, the AMF entity may configure the model update policy for the APF entity, and the APF entity obtains monitored data (or the monitored data is referred to as first data or the like, and this is not limited in this application) from a DSF entity based on the model update policy. The monitored data is used to determine whether the model meets the update condition in the model update policy. Therefore, the APF entity determines, based on the model update policy and the monitored data, whether the model needs to be updated, and indicates the AMF entity to update the model when determining that the model needs to be updated.

In another possible implementation, the first function entity may be an AMF entity in the DA, and the second function entity may be an MEF entity. In other words, the MEF entity triggers update. The AMF entity and the MEF entity may be located in a same network element, or may be located in different network elements. For example, both the AMF entity and the MEF entity are on the CUDA. For another example, the AMF entity is located on the CUDA, and the MEF entity is located on the DUDA. For another example, the AMF entity is located on the RANDA, and the MEF entity is located on a gNBDA.

Specifically, the AMF entity configures the model update policy for the MEF entity, and the MEF entity obtains monitored data from a DSF entity based on the model update policy. Therefore, the MEF entity determines, based on the model update policy and the monitored data, whether the model needs to be updated, and indicates the AMF entity to update the model when determining that the model needs to be updated.

Figure 5A:
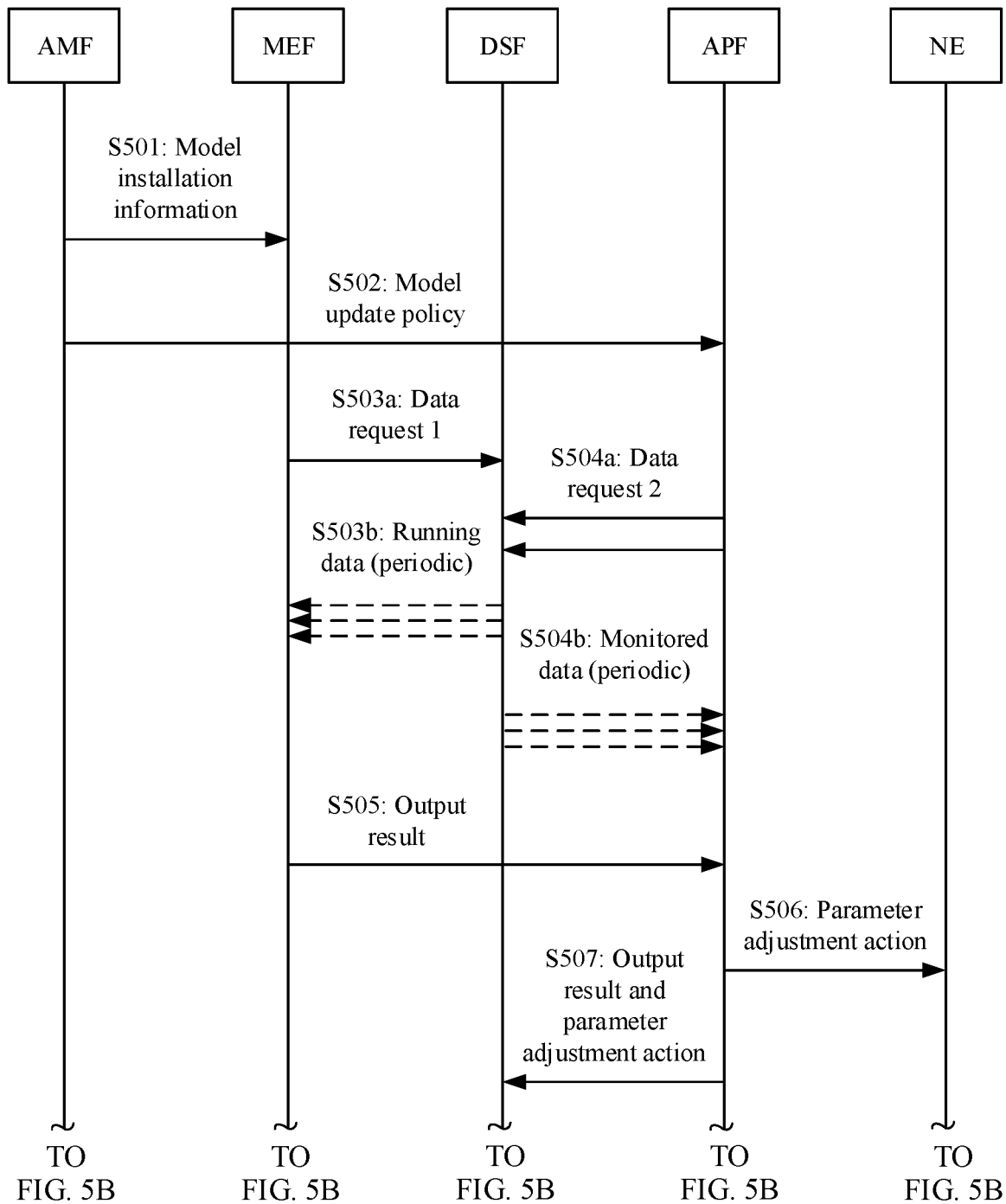
FIG. 5A and FIG. 5B are a schematic diagram of a corresponding procedure of a model update method that is triggered by an APF entity according to an embodiment of this application.
Figure 5B:
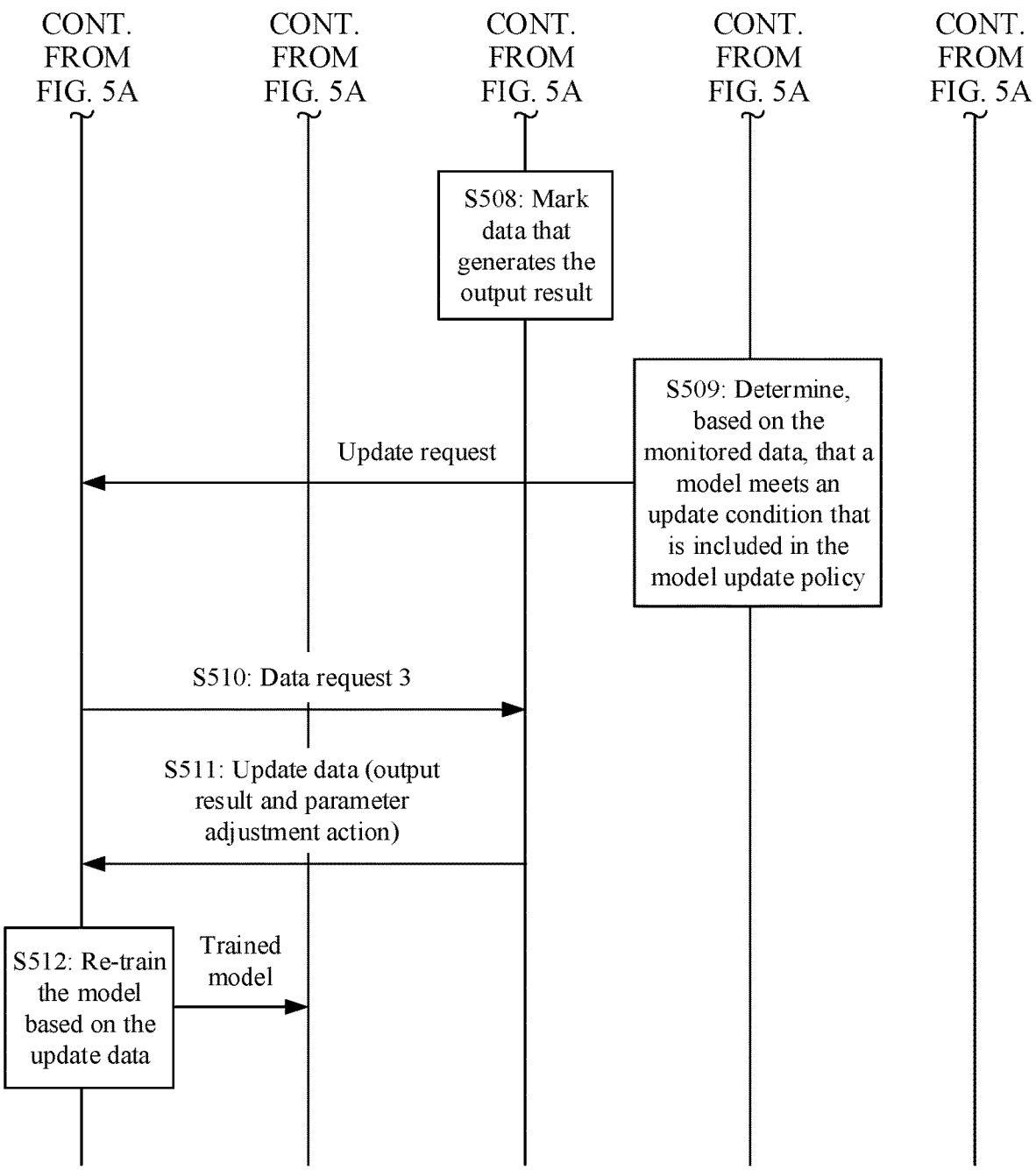

Referring to FIG. 5A and FIG. 5B, a model update method is described in detail by using an example in which an APF entity triggers model update.

An AMF entity, an APF entity, an MEF entity, and a DSF entity shown in FIG. 5A and FIG. 5B may be located in a same network element, or may be located in different network elements. For example, the AMF entity, the APF entity, the MEF entity, and the DSF entity are all on a CUDA. For another example, the AMF entity is located on the CUDA, and the APF entity, the MEF entity, and the DSF entity are located on a DUDA. For another example, the AMF entity is located on a RANDA, and the APF entity, the MEF entity, and the DSF entity are located on a gNBDA.

S501: The AMF entity sends model installation information to the MEF entity, where the model installation information includes a model of a first network element. The model installation information may further include an index of data that needs to be subscribed to from the DSF entity when the MEF runs the model. For ease of subsequent description, the data needed for running the model is referred to as running data.

S502: The AMF entity sends a model update policy to the APF entity.

The model update policy includes an update condition of the model. The model update policy may further include an index of monitored data. For example, the model needs to adjust a target key performance indicator (KPI) in an NE, and the KPI may be a circuit switching (CS) call drop rate, or a calculation manner of traffic or load. For example, the traffic or the load is a weighted sum of traffic or load of a plurality of cells.

The update condition may be configured based on an actual application scenario, to meet requirements in different application scenarios. For example, in view of a threshold of the KPI, when the KPI is lower than the threshold, the model update is triggered. For example, an update condition in a traffic prediction scenario may be a threshold of a prediction error, and the prediction error may be a difference between actual traffic and predicted traffic. For another example, an update condition in an adaptive modulation and coding (AMC) scenario may be a throughput rate threshold. In the traffic prediction scenario, the actual traffic needs to be monitored. Therefore, the monitored data may be traffic, or may be data used to calculate the traffic. In the AMC scenario, a throughput rate needs to be monitored. Therefore, the monitored data may be a throughput, or may be data used to calculate the throughput.

In this embodiment of this application, the model installation information and the model update policy that are sent in S501 and S502 may be sent in one message, or may be sent in different messages. When the model installation information and the model update policy are sent in different messages, an execution sequence of S501 and S502 is not specifically limited.

S503a: The MEF entity sends a data request 1 to the DSF entity, where the data request 1 is used to request data needed for running the model. Specifically, the running data is obtained from the DSF entity based on the index of the running data in step S501. That is, the data request 1 includes the index of the running data.

S503b: The DSF entity sends the running data to the MEF based on the data request 1. Specifically, the DSF entity periodically sends the running data to the MEF based on the index of the running data. The running data sent in each period is data reflecting a network environment status in the period.

S504a: The APF entity sends a data request 2 to the DSF entity, where the data request 2 is used to request the monitored data. Specifically, the monitored data is obtained from the DSF entity based on the index of the monitored data in step S502. That is, the data request 2 includes the index of the monitored data.

S504b: The DSF entity sends the monitored data to the APF entity based on the data request 2. Specifically, the DSF entity periodically sends the monitored data to the MEF entity based on the index of the monitored data.

In this embodiment of this application, an execution sequence of S503a and S504a is not limited.

S505: The MEF entity inputs the running data obtained in S503b into the model to generate an output result, and sends the output result to the APF entity. Specifically, after obtaining the running data in each period, the MEF entity inputs the obtained running data into the model to generate the output result, and sends the output result to the APF entity.

S506: After receiving the output result, the APF entity determines a parameter adjustment action of the first network element based on the output result, and sends the parameter adjustment action of the first network element to the first network element.

For example, the APF entity stores a correspondence between the output result and the parameter adjustment action, to determine, based on the correspondence, the parameter adjustment action corresponding to the received output result.

Optionally, the foregoing correspondence may also be stored in the MEF entity. Therefore, after obtaining the output result of the model, the MEF entity determines the parameter adjustment action of the first network element based on the output result, and sends the parameter adjustment action of the first network element to the APF entity, so that the APF entity forwards the parameter adjustment action of the first network element to the first network element. In addition, the model can also directly output the parameter adjustment action, that is, the output result is the parameter adjustment action.

S507: The APF entity sends the output result of the model and the parameter adjustment action corresponding to the output result to the DSF entity.

For example, specific sent content may include an identifier of the model, the output result of the model, an index of data that generates the output result, and the parameter adjustment action corresponding to the output result. Alternatively, the sent content may not include the index of the data that generates the output result. Because the DSF entity periodically sends the running data to the MEF entity, the MEF entity also periodically inputs the running data into the model to generate the output result and periodically sends the output result to the APF entity, and the APF entity also periodically sends the output result to the DSF entity, the DSF entity can determine a period in which data based on which the sent content of the APF entity that is received each time is generated is sent.

S508: After receiving the output result of the model and the parameter adjustment action, the DSF entity marks the data that generates the output result, to update the model.

S509: After S504b, the APF entity receives the monitored data sent by the DSF entity, and determines, based on the model update policy received in S502, whether performance of the model deteriorates, that is, determines, based on the monitored data, whether the model meets the update condition that is included in the model update policy, and if the model meets the update condition that is included in the model update policy, sends, to the AMF entity, an update request used to trigger the model update. For example, in an application scenario of cell traffic prediction, traffic of each future time period (per hour) of a cell needs to be predicted. In this case, an output of the model is traffic of a next hour, namely, the predicted traffic, and the model update policy may be an error threshold between the predicted traffic and the actual traffic. After the actual traffic is obtained in the next hour, a prediction error between the predicted traffic and the actual traffic is calculated, and the prediction error is compared with a threshold of the prediction error. If the prediction error is greater than the threshold of the prediction error, a model update process is triggered, and the model update request is sent; otherwise, the model continues to run.

S510: After receiving the update request sent by the APF entity, the AMF entity sends a data request 3 to the DSF entity, where the data request 3 is used to request data of the first network element that is required for the model update. For ease of description subsequently, the data is referred to as update data. The data request 3 may include an index of the update data.

S511: The DSF entity sends the update data to the AMF entity based on the data request 3. The update data includes the output result that is of the model and that is determined by the MEF entity and that is received in S508, and the parameter adjustment action that corresponds to the output result and that is determined by the APF entity based on the output result.

S512: The AMF entity re-trains the model based on the update data, and sends the trained model to the MEF entity.

Optionally, the AMF entity may update the model update policy, and send the updated model update policy to the APF entity.

According to a model update mechanism in this application, the model update mechanism is changed from an active periodic update to a passive triggered update, so that a network can detect an effect of model running and the network status. The model update policy can be configured based on a scenario. Therefore, flexibility of the model update policy is relatively high. The APF subscribes to data from the DSF to determine the network environment status. If performance of the model does not deteriorate, the model does not need to be updated. In this way, a computing resource for training the model is saved and a model transmission process is omitted. If network performance deteriorates, the APF sends the update request to trigger the AMF to re-train the model, to update the model.

In the embodiment corresponding to FIG. 5A and FIG. 5B, the APF entity triggers the AMF entity to update only the model of which performance deteriorates.

In a possible implementation, a system includes a plurality of network elements including the first network element. The plurality of network elements correspond to same models, the plurality of network elements are managed by at least two APF entities, related data of the plurality of network elements is managed by at least two DSF entities, the models respectively corresponding to the plurality of network elements are configured in at least two MEFs. In this implementation, the AMF entity may be located in the RANDA, and the APF entity, the MEF entity, and the DSF entity are located in the gNBDA; or the AMF entity is located in the CUDA, and the APF entity, the MEF entity, and the DSF entity are located in the DUDA. When the plurality of APF entities all trigger model update to the AMF entity, the AMF may trigger update for the models of the plurality of network elements in the system.

Specifically, after the AMF entity sends the model update policy to each APF entity, when the AMF entity determines that a quantity of APF entities that send the update request and that are received in preset duration reaches a preset threshold, the AMF entity separately sends a data request to the at least two DSF entities, and the data request is used to request data that separately corresponds to the plurality of network elements and that is required for updating the model; the AMF entity receives the data that separately corresponds to the plurality of network elements and that is sent by the at least two DSF entities; and the AMF entity re-trains the model based on the data separately corresponding to the plurality of network elements, and separately sends the re-trained model to the at least two MEFs.

Figure 6:
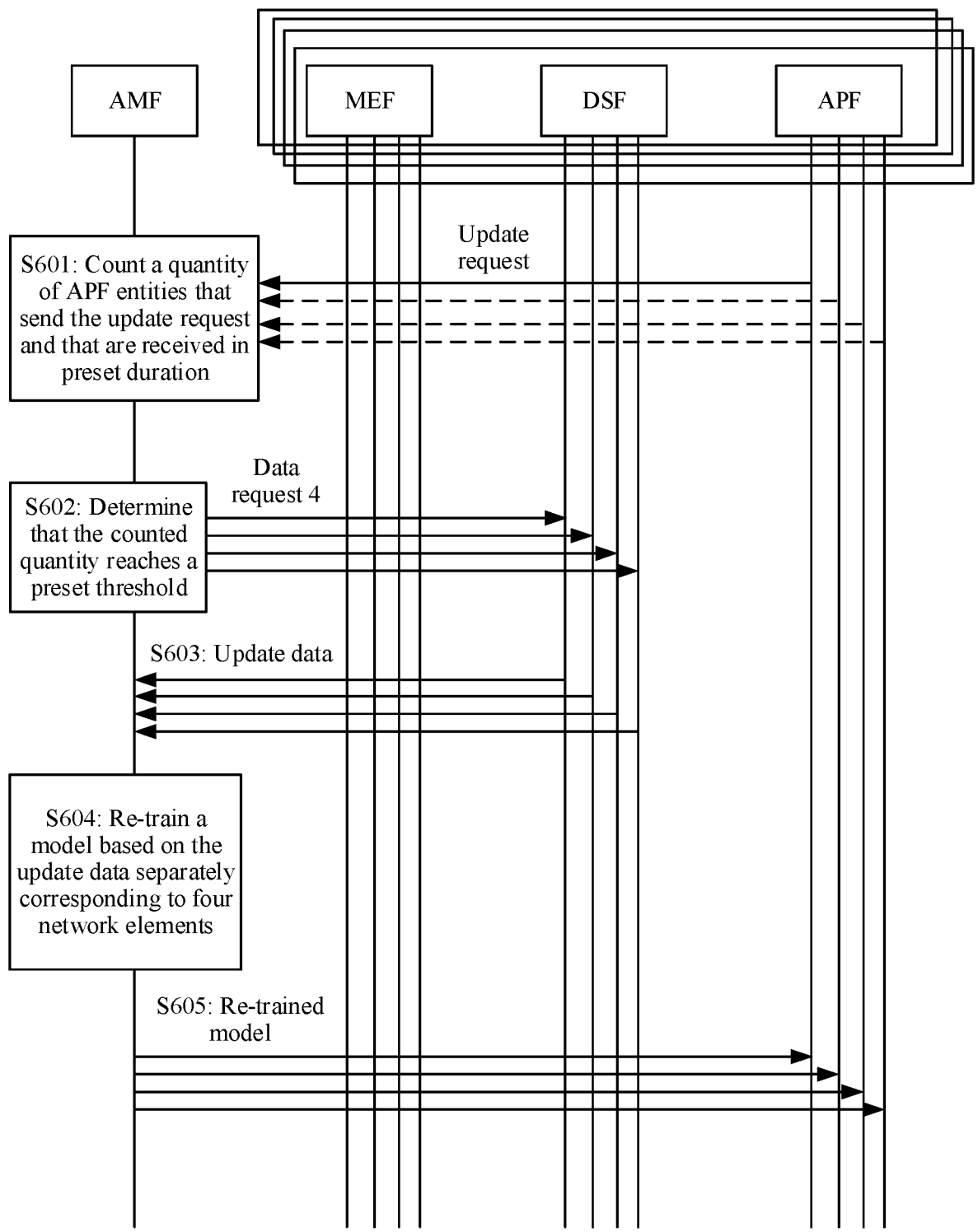
FIG. 6 is a schematic diagram of a procedure of a model update method that is globally triggered according to an embodiment of this application.

Referring to FIG. 6, that an AMF entity triggers update of models of a plurality of network elements in a system is described in detail. A user configures a global update policy in the AMF entity. When a condition that is included in the global update policy is met, global update is triggered. The condition may be that a quantity of update requests that corresponds to a local model reaches a preset threshold. For example, models of four network elements in the system are the same, and the four network elements are a network element 1 to a network element 4. The models of the four network elements are configured in four MEF entities. The four network elements are managed by four APF entities, and related data of N network elements is managed by four DSF entities.

The AMF entity performs the method steps described in S501 and S502 for an MEF entity corresponding to each network element. Details are not described herein again.

N MEF entities, N APF entities, and N DSF entities are all performed based on the method steps described in S503a to S509. Details are not described herein again.

After step S509, the AMF entity re-trains the model in the following manner:

S601: The AMF entity counts a quantity of APF entities that send the update request and that are received in preset duration.

S602: When determining that the counted quantity reaches a preset threshold, the AMF entity separately sends a data request 4 to the four DSF entities. The data request 4 is used to request data that separately corresponds to the four network elements and that is required for updating the model.

S603: The AMF entity receives update data that separately corresponds to the four network elements and that is sent by the four DSF entities.

Each network element has corresponding update data in a current network environment status.

The update data corresponding to each network element in the plurality of network elements includes an output result of the model of the network element and a parameter adjustment action corresponding to the output result.

S604: The AMF entity re-trains the model based on the update data separately corresponding to the four network elements.

S605: The AMF entity separately sends the re-trained model to the four MEF entities.

Figure 7A:
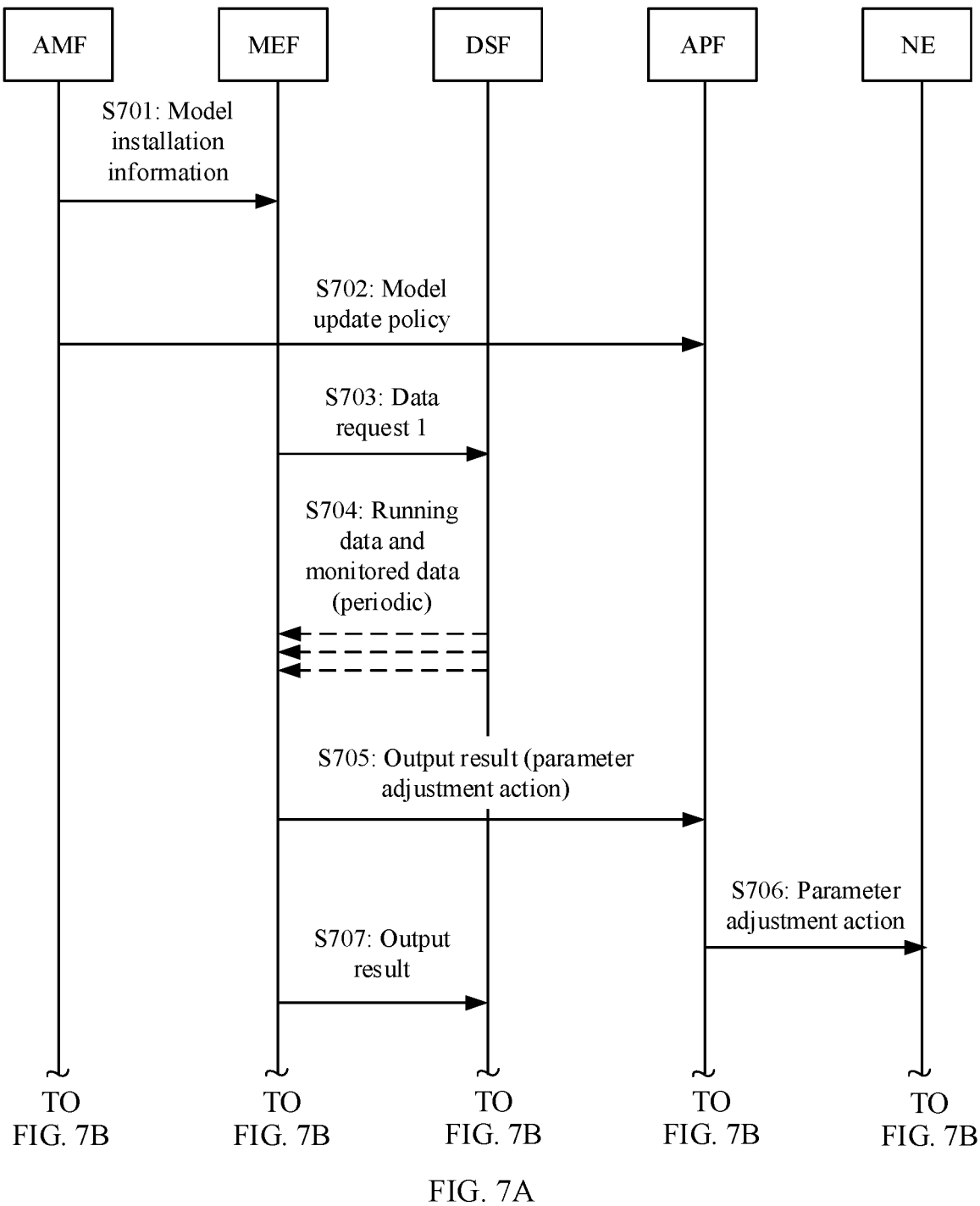
FIG. 7A and FIG. 7B are a schematic diagram of a procedure of a model update method that is triggered by an MEF entity according to an embodiment of this application.
Figure 7B:
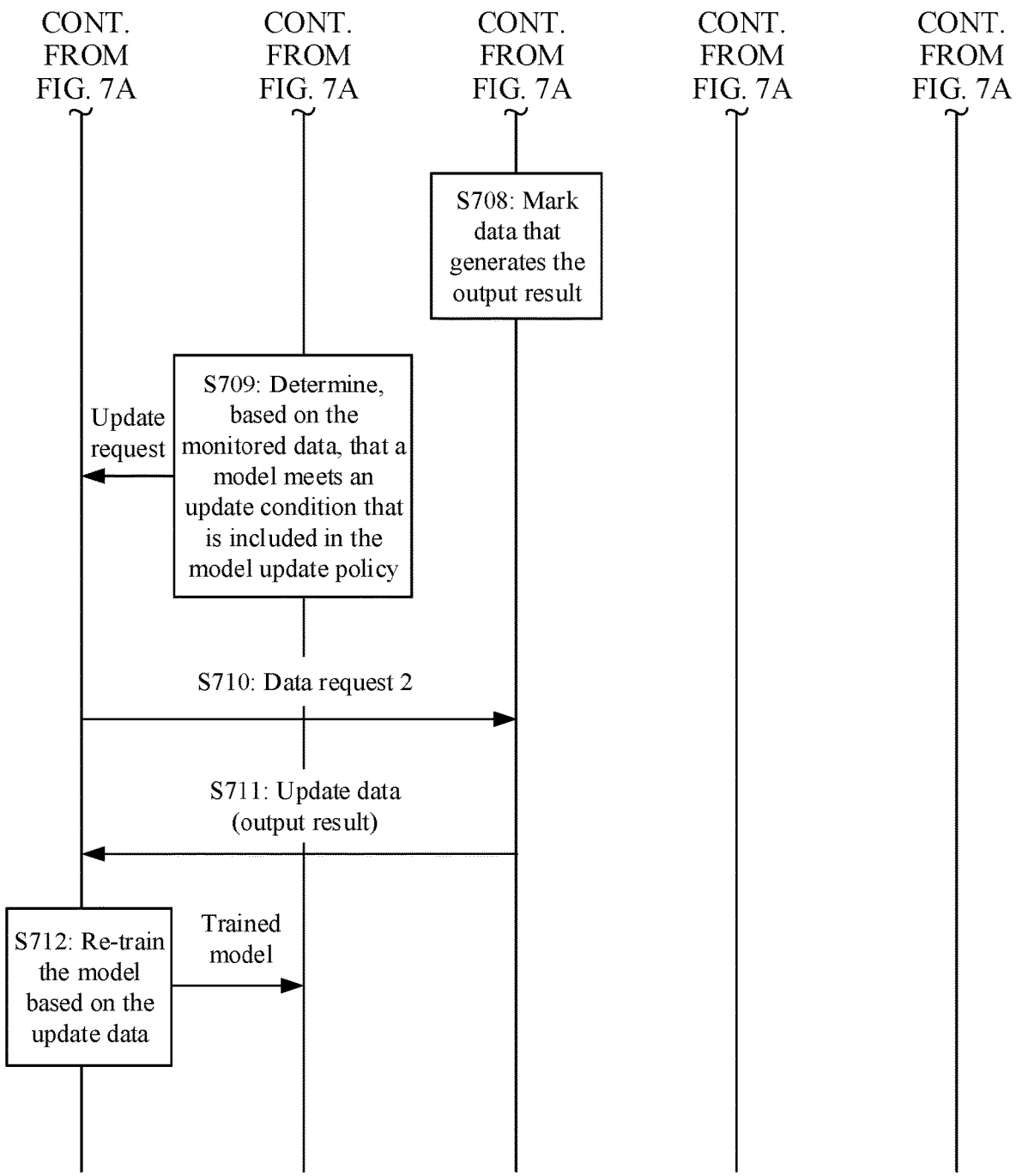

Referring to FIG. 7A and FIG. 7B, a model update method is described in detail by using an example in which an MEF entity triggers model update.

An AMF entity, an APF entity, an MEF entity, and a DSF entity shown in FIG. 7A and FIG. 7B may be located in a same network element, or may be located in different network elements. For example, the AMF entity, the APF entity, the MEF entity, and the DSF entity are all on a CUDA. For another example, the AMF entity is located on the CUDA, and the APF entity, the MEF entity, and the DSF entity are located on a DUDA. For another example, the AMF entity is located on a RANDA, and the APF entity, the MEF entity, and the DSF entity are located on a gNBDA.

S701: The AMF entity sends model installation information to the MEF entity, where the model installation information includes a model of a first network element. For details, refer to related descriptions of S501. Details are not described herein again.

S702: The AMF entity sends a model update policy to the MEF entity. For specific descriptions of a model update policy, refer to any one of the foregoing embodiments. Details are not described herein again.

The AMF entity may send the model installation information and the model update policy to the MEF entity by using one message, or may separately send the model installation information and the model update policy to the MEF entity by using two messages. This is not specifically limited in this application.

S703. The MEF entity sends a data request 1 to the DSF entity, where the data request 1 is used to request to obtain running data and monitored data. For related descriptions of the running data and the monitored data, reference may be made to the descriptions in any embodiment. Details are not described herein again.

Optionally, the MEF entity may alternatively separately request to obtain the running data and the monitored data by using two messages. This is not specifically limited in this application.

S704: The DSF entity sends the running data and the monitored data to the MEF entity. Specifically, the DSF entity periodically sends the running data and the monitored data to the MEF entity.

S705: The MEF entity receives the running data and inputs the running data into the model to generate an output result, and sends the output result to the APF entity. Specifically, after obtaining the running data in each period, the MEF entity inputs the obtained running data into the model to generate the output result, and sends the output result to the APF entity. The output result herein is a parameter adjustment action.

S706: After receiving the output result, the APF entity sends the parameter adjustment action to the first network element.

S707: The MEF entity sends the output result to the DSF entity. For example, specific sent content may include an identifier of the model, the output result of the model, an index of data that generates the output result. Alternatively, the sent content may not include the index of the data that generates the output result. Because the DSF entity periodically sends the running data to the MEF entity, the MEF entity also periodically inputs the running data into the model to generate the output result and periodically sends the output result to the DSF entity, the DSF entity can determine a period in which data based on which the sent content of the MEF entity that is received each time is generated is sent.

S708: After receiving the output result of the model, the DSF entity marks the data that generates the output result, to update the model.

S709: The MEF entity receives the monitored data sent by the DSF entity, and determines, based on the model update policy, whether performance of the model deteriorates, that is, determines, based on the monitored data, whether the model meets the update condition that is included in the model update policy. When the model meets the update condition that is included in the model update policy, sends, to the AMF entity, an update request used to trigger the model update.

S710: After receiving the update request sent by the MEF entity, the AMF entity sends a data request 2 to the DSF entity, where the data request 2 is used to request to update data, and the data request 2 may include an index of update data.

S711: The DSF entity sends the update data to the AMF entity based on the data request 2. The updated data includes the output result of the model.

S712: The AMF entity re-trains the model based on the update data, and sends the trained model to the MEF entity.

Optionally, the AMF entity may update the model update policy, and send the updated model update policy to the MEF entity.

According to a model update mechanism in this application, the model update mechanism is changed from an active periodic update to a passive triggered update, so that a network can detect an effect of model running and the network status. The model update policy can be configured based on a scenario. Therefore, flexibility of the model update policy is relatively high. The MEF subscribes to data from the DSF to determine the network environment status. If performance of the model does not deteriorate, the model does not need to be updated. In this way, a computing resource for training the model is saved and a model transmission process is omitted. If network performance deteriorates, the MEF sends the update request to trigger the AMF to re-train the model, to update the model.

In a possible implementation, a system includes a plurality of network elements including the first network element. The plurality of network elements correspond to same models, the plurality of network elements are managed by at least two APF entities, related data of the plurality of network elements is managed by at least two DSF entities, the models respectively corresponding to the plurality of network elements are configured in at least two MEFs. In this implementation, the AMF entity may be located in the RANDA, and the APF entity, the MEF entity, and the DSF entity are located in the gNBDA; or the AMF entity is located in the CUDA, and the APF entity, the MEF entity, and the DSF entity are located in the DUDA. When the plurality of MEF entities all trigger model update to the AMF entity, the AMF may trigger update for the models of the plurality of network elements in the system. Specifically, after the AMF entity sends the model update policy to each MEF entity, when the AMF entity determines that a quantity of MEF entities that send the update request and that are received in preset duration reaches a preset threshold, the AMF entity separately sends a data request to the at least two DSF entities, and the data request is used to request data that separately corresponds to the plurality of network elements and that is required for updating the model; the AMF entity receives the data that separately corresponds to the plurality of network elements and that is sent by the at least two DSF entities; and the AMF entity re-trains the model based on the data separately corresponding to the plurality of network elements, and separately sends the re-trained model to the at least two MEF entities.

Figure 8:
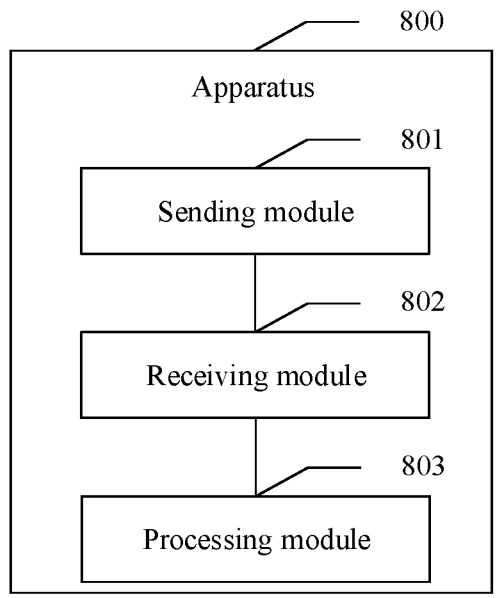
FIG. 8 is a schematic structural diagram of an apparatus 800 according to an embodiment of this application.

Based on a same inventive concept as the method embodiments, an embodiment of this application further provides an apparatus 800. Referring to FIG. 8, the apparatus 800 is applied to an AMF entity. The apparatus 800 may be specifically a processor, a chip, a chip system, a function module, or the like in the AMF entity. The apparatus may include a sending module 801, a receiving module 802, and a processing module 803. The processing module 803 is configured to control and manage an action of the apparatus 800. The sending module 801 is configured to perform a sending action performed by the first function entity or the AMF entity in any embodiment of this application. The processing module 803 is configured to perform a processing action performed by the first function entity and the AMF entity in any embodiment of this application, for example, training a model. The receiving module 802 is configured to perform a receiving action performed by the first function entity and the AMF entity in any embodiment of this application. Repeated parts are not described in detail herein again. The processing module 803 may be further configured to indicate a processing process related to the first function entity or the AMF entity in any one of the foregoing embodiments and/or another process of the technical solutions described in this application.

Figure 9:
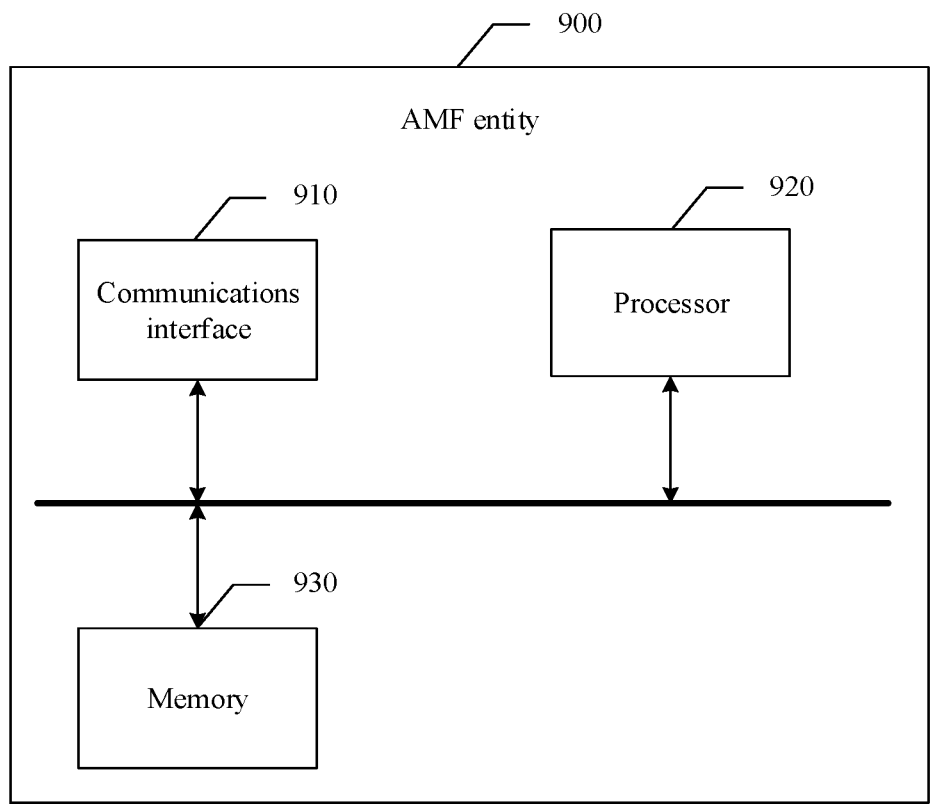
FIG. 9 is a schematic structural diagram of an apparatus 900 according to an embodiment of this application.

An embodiment of this application further provides another structure of an AMF entity. As shown in FIG. 9, an AMF entity 900 may include a communications interface 910 and a processor 920. Optionally, the AMF entity 900 may further include a memory 930. The memory 930 may be disposed inside the AMF entity, or may be disposed outside the AMF entity. The processing module 803 shown in FIG. 8 may be implemented by the processor 920. The sending module 801 and the receiving module 802 may be implemented by the communications interface 910. The processor 920 receives information or a message through the communications interface 910, and is configured to implement the methods performed by the AMF entity or the first function entity in FIG. 4 to FIG. 7A and FIG. 7B. In an implementation process, steps in a processing procedure may complete, by using an integrated logic circuit of hardware in the processor 920 or an instruction in a form of software, the methods performed by the AMF entity in FIG. 4 to FIG. 7A and FIG. 7B.

The communications interface 910 in this embodiment of this application may be a circuit, a bus, a transceiver, or any another apparatus that may be configured to exchange information. For example, the another apparatus may be a device connected to the apparatus 900. For example, the another apparatus may be a DSF entity, an MEF entity, or an APF entity.

In this embodiment of this application, the processor 920 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by using a combination of hardware in the processor and a software unit. Program code executed by the processor 920 to implement the foregoing method may store in the memory 930. The memory 930 is coupled to the processor 920.

Coupling in this embodiment of this application is an indirect coupling or a communication connection between apparatuses, units, or modules, may be in an electrical form, a mechanical form, or another form, and is used for information exchange between the apparatuses, the units, or the modules.

The processor 920 may operate in collaboration with the memory 930. The memory 930 may be a nonvolatile memory, for example, a hard disk drive (HDD) or a solid-state drive (SSD), or may be a volatile memory, for example, a random access memory (RAM). The memory 930 is any other medium that can be configured to carry or store expected program code in a form of an instruction or a data structure and that can be accessed by a computer, but is not limited thereto.

In this embodiment of this application, a specific connection medium between the communications interface 910, the processor 920, and the memory 930 is not limited. In this embodiment of this application, the memory 930, the processor 920, and the communications interface 910 are connected through a bus in FIG. 9, and the bus is represented by a thick line in FIG. 9. A connection manner between other components is schematically described, and is not limited thereto. The bus may be classified into an address bus, a data bus, a control bus, and the like. For ease of representation, only one thick line is used to represent the bus in FIG. 9, but this does not mean that there is only one bus or only one type of bus.

Figure 10:
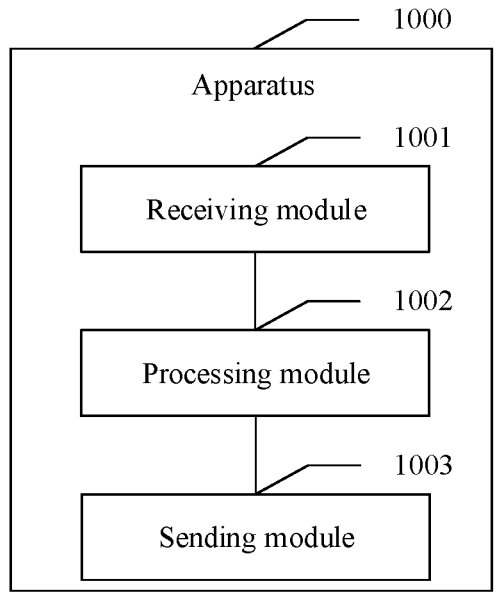
FIG. 10 is a schematic structural diagram of an apparatus 1000 according to an embodiment of this application.

Based on a same inventive concept as the method embodiments, an embodiment of this application further provides an apparatus. Referring to FIG. 10, the apparatus 1000 is applied to an MEF entity. The apparatus 1000 may be specifically a processor, a chip, a chip system, a function module, or the like in the MEF entity. The apparatus may include a receiving module 1001, a processing module 1002, and a sending module 1003. The processing module 1002 is configured to control and manage an action of the apparatus 1000. The sending module 1003 is configured to perform a sending action performed by a second function entity or the MEF entity in any embodiment of this application. The processing module 1002 is configured to perform a processing action performed by the second function entity and the MEF entity in any embodiment of this application, for example, inputting data into a model to obtain an output result. The receiving module 1001 is configured to perform a receiving action performed by the second function entity and the MEF entity in any embodiment of this application. Repeated parts are not described in detail herein again. The processing module 1002 may be further configured to indicate a processing process related to the second function entity or the MEF entity in any one of the foregoing embodiments and/or another process of the technical solutions described in this application.

Figure 11:
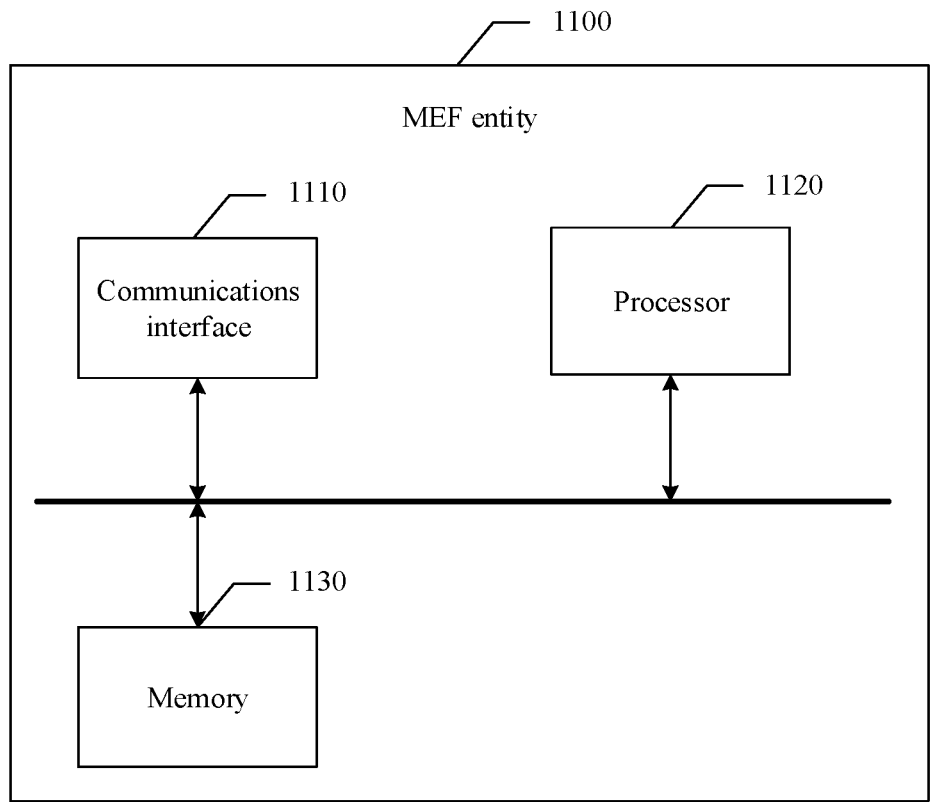
FIG. 11 is a schematic structural diagram of an apparatus 1100 according to an embodiment of this application.

An embodiment of this application further provides a structure of another MEF entity. As shown in FIG. 11, the MEF entity 1100 may include a communications interface 1110 and a processor 1120. Optionally, the MEF entity 1100 may further include a memory 1130. The memory 1130 may be disposed inside the MEF entity, or may be disposed outside the MEF entity. The processing module 1002 shown in FIG. 10 may be implemented by the processor 1120. The sending module 1003 and the receiving module 1001 may be implemented by the communications interface 1110. The processor 1120 receives information or a message through the communications interface 1110, and is configured to implement the methods performed by the MEF entity or the second function entity in FIG. 4 to FIG. 7A and FIG. 7B. In an implementation process, steps in a processing procedure may complete, by using an integrated logic circuit of hardware in the processor 1120 or an instruction in a form of software, the methods performed by the MEF entity in FIG. 4 to FIG. 7A and FIG. 7B.

The communications interface 1110 in this embodiment of this application may be a circuit, a bus, a transceiver, or any another apparatus that may be configured to exchange information. For example, the another apparatus may be a device connected to the apparatus 1100. For example, the another apparatus may be a DSF entity, an AMF entity, or an APF entity.

In this embodiment of this application, the processor 1120 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by using a combination of hardware in the processor and a software unit. Program code executed by the processor 1120 to implement the foregoing method may store in the memory 1130. The memory 1130 is coupled to the processor 1120.

Coupling in this embodiment of this application is an indirect coupling or a communication connection between apparatuses, units, or modules, may be in an electrical form, a mechanical form, or another form, and is used for information exchange between the apparatuses, the units, or the modules.

The processor 1120 may operate in collaboration with the memory 1130. The memory 1130 may be a nonvolatile memory, for example, a hard disk drive (HDD) or a solid-state drive (SSD), or may be a volatile memory, for example, a random access memory (RAM). The memory 1130 is any other medium that can be configured to carry or store expected program code in a form of an instruction or a data structure and that can be accessed by a computer, but is not limited thereto.

In this embodiment of this application, a specific connection medium between the communications interface 1110, the processor 1120, and the memory 1130 is not limited. In this embodiment of this application, the memory 1130, the processor 1120, and the communications interface 1110 are connected through a bus in FIG. 11, and the bus is represented by a thick line in FIG. 11. A connection manner between other components is schematically described, and is not limited thereto. The bus may be classified into an address bus, a data bus, a control bus, and the like. For ease of representation, only one thick line is used to represent the bus in FIG. 11, but this does not mean that there is only one bus or only one type of bus.

Figure 12:
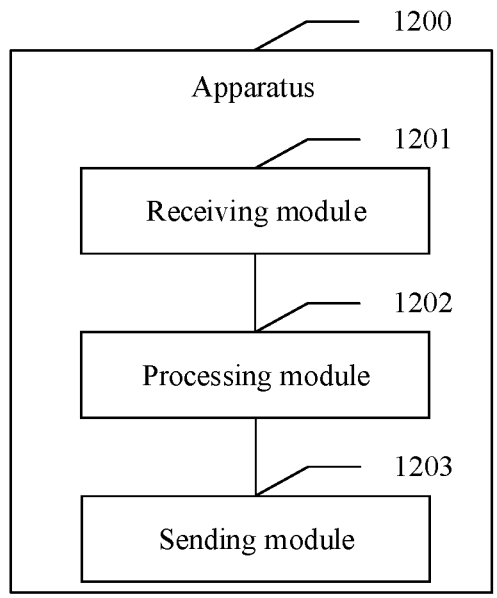
FIG. 12 is a schematic structural diagram of an apparatus 1200 according to an embodiment of this application.

Based on a same inventive concept as the method embodiments, an embodiment of this application further provides an apparatus. Referring to FIG. 12, the apparatus 1200 is applied to an APF entity. The apparatus 1200 may be specifically a processor, a chip, a chip system, a function module, or the like in the APF entity. The apparatus may include a receiving module 1201, a processing module 1202, and a sending module 1203. The processing module 1202 is configured to control and manage an action of the apparatus 1200. The sending module 1203 is configured to perform a sending action performed by a second function entity or the APF entity in any embodiment of this application. The processing module 1202 is configured to perform a processing action performed by the second function entity and the APF entity in any embodiment of this application, for example, inputting data into a model to obtain an output result. The receiving module 1201 is configured to perform a receiving action performed by the second function entity and the APF entity in any embodiment of this application. Repeated parts are not described in detail herein again. The processing module 1202 may be further configured to indicate a processing process related to the second function entity or the APF entity in any one of the foregoing embodiments and/or another process of the technical solutions described in this application.

Figure 13:
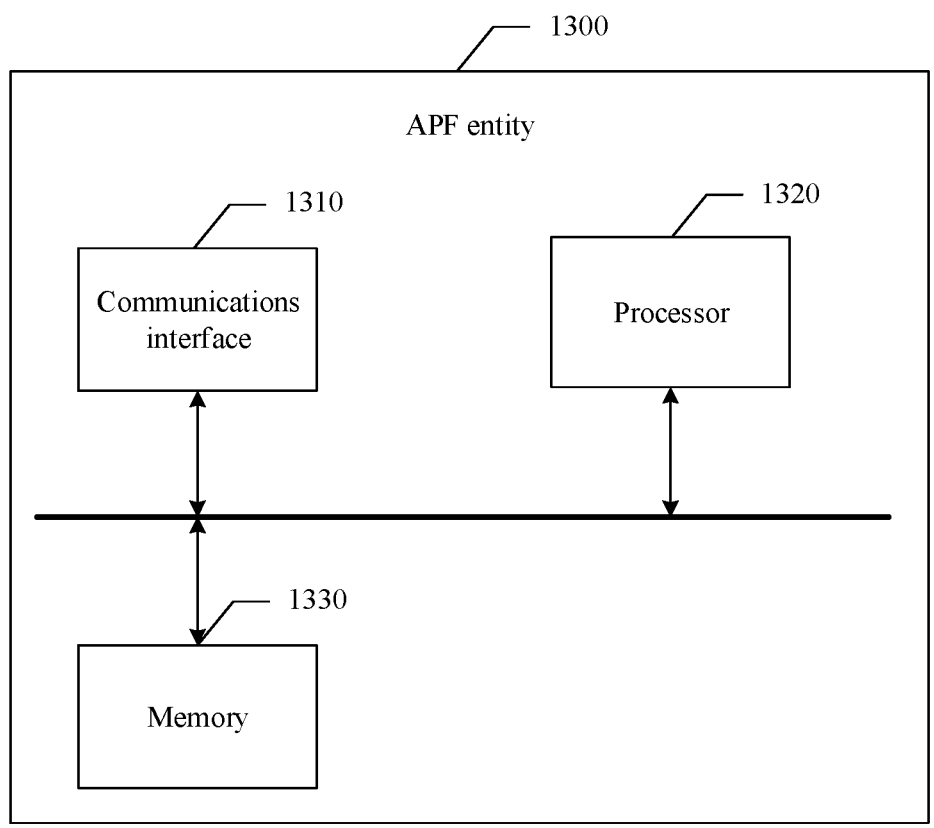
FIG. 13 is a schematic structural diagram of an apparatus 1300 according to an embodiment of this application.

An embodiment of this application further provides a structure of another APF entity. As shown in FIG. 13, the APF entity 1300 may include a communications interface 1310 and a processor 1320. Optionally, the APF entity 1300 may further include a memory 1330. The memory 1330 may be disposed inside the APF entity, or may be disposed outside the APF entity. The processing module 1202 shown in FIG. 12 may be implemented by the processor 1320. The sending module 1203 and the receiving module 1201 may be implemented by the communications interface 1310. The processor 1320 receives information or a message through the communications interface 1310, and is configured to implement the methods performed by the APF entity or the second function entity in FIG. 4 to FIG. 7A and FIG. 7B. In an implementation process, steps in a processing procedure may complete, by using an integrated logic circuit of hardware in the processor 1320 or an instruction in a form of software, the methods performed by the APF entity in FIG. 4 to FIG. 7A and FIG. 7B.

The communications interface 1310 in this embodiment of this application may be a circuit, a bus, a transceiver, or any another apparatus that may be configured to exchange information. For example, the another apparatus may be a device connected to the apparatus 1300. For example, the another apparatus may be a DSF entity, an AMF entity, or an MEF entity.

In this embodiment of this application, the processor 1320 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by using a combination of hardware in the processor and a software unit. Program code executed by the processor 1320 to implement the foregoing method may store in the memory 1330. The memory 1330 is coupled to the processor 1320.

Coupling in this embodiment of this application is an indirect coupling or a communication connection between apparatuses, units, or modules, may be in an electrical form, a mechanical form, or another form, and is used for information exchange between the apparatuses, the units, or the modules.

The processor 1320 may operate in collaboration with the memory 1330. The memory 1330 may be a nonvolatile memory, for example, a hard disk drive (HDD) or a solid-state drive (SSD), or may be a volatile memory, for example, a random access memory (RAM). The memory 1330 is any other medium that can be configured to carry or store expected program code in a form of an instruction or a data structure and that can be accessed by a computer, but is not limited thereto.

In this embodiment of this application, a specific connection medium between the communications interface 1310, the processor 1320, and the memory 1330 is not limited. In this embodiment of this application, the memory 1330, the processor 1320, and the communications interface 1310 are connected through a bus in FIG. 13, and the bus is represented by a thick line in FIG. 13. A connection manner between other components is schematically described, and is not limited thereto. The bus may be classified into an address bus, a data bus, a control bus, and the like. For ease of representation, only one thick line is used to represent the bus in FIG. 13, but this does not mean that there is only one bus or only one type of bus.

Figure 14:
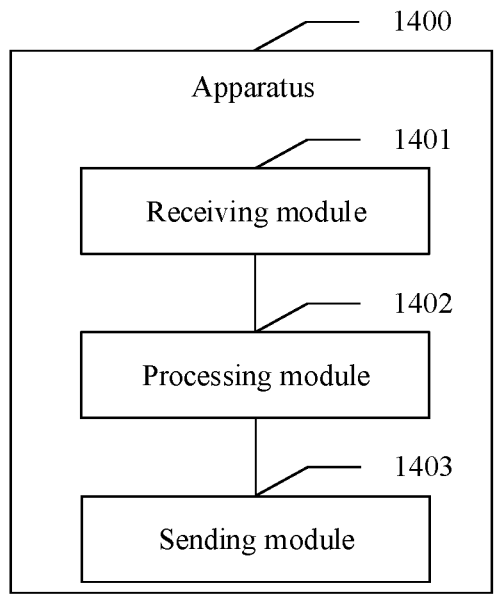
FIG. 14 is a schematic structural diagram of an apparatus 1400 according to an embodiment of this application.

Based on a same inventive concept as the method embodiments, an embodiment of this application further provides an apparatus. Referring to FIG. 14, the apparatus 1400 is applied to a DSF entity. The apparatus 1400 may be specifically a processor, a chip, a chip system, a function module, or the like in the DSF entity. The apparatus may include a receiving module 1401, a processing module 1402, and a sending module 1403. The processing module 1402 is configured to control and manage an action of the apparatus 1400. The sending module 1403 is configured to perform a sending action performed by the DSF entity in any embodiment of this application. The processing module 1402 is configured to perform a processing action performed by the DSF entity in any embodiment of this application, for example, inputting data into a model to obtain an output result. The receiving module 1401 is configured to perform a receiving action performed by the DSF entity in any embodiment of this application. Repeated parts are not described in detail herein again. The processing module 1402 may be further configured to indicate a processing process related to the DSF entity in any one of the foregoing embodiments and/or another process in the technical solutions described in this application.

Figure 15:
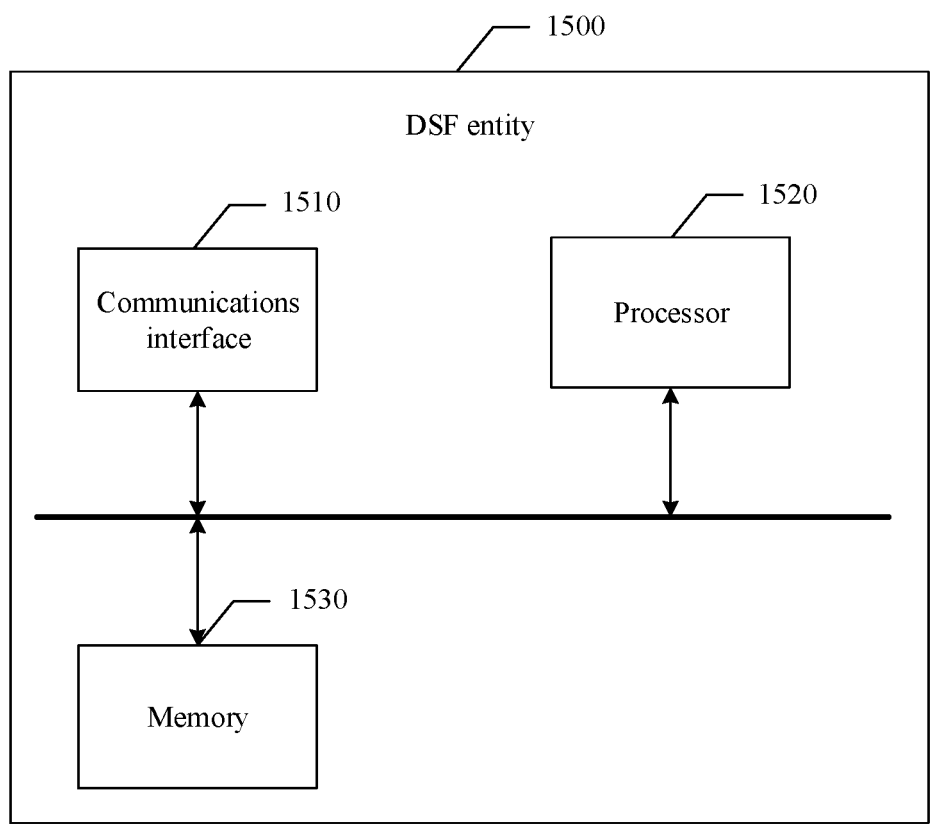
FIG. 15 is a schematic structural diagram of an apparatus 1500 according to an embodiment of this application.

An embodiment of this application further provides a structure of another DSF entity. As shown in FIG. 15, the DSF entity 1500 may include a communications interface 1510 and a processor 1520. Optionally, the DSF entity 1500 may further include a memory 1530. The memory 1530 may be disposed inside the DSF entity, or may be disposed outside the DSF entity. The processing module 1402 shown in FIG. 14 may be implemented by the processor 1520. The sending module 1403 and the receiving module 1401 may be implemented by the communications interface 1510. The processor 1520 receives information or a message through the communications interface 1510, and is configured to implement the methods performed by the DSF entity or the second function entity in FIG. 4 to FIG. 7A and FIG. 7B. In an implementation process, steps in a processing procedure may complete, by using an integrated logic circuit of hardware in the processor 1520 or an instruction in a form of software, the methods performed by the DSF entity in FIG. 4 to FIG. 7A and FIG. 7B.

The communications interface 1510 in this embodiment of this application may be a circuit, a bus, a transceiver, or any another apparatus that may be configured to exchange information. For example, the another apparatus may be a device connected to the apparatus 1500. For example, the another apparatus may be a DSF entity, an AMF entity, or an MEF entity.

In this embodiment of this application, the processor 1520 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by using a combination of hardware in the processor and a software unit. Program code executed by the processor 1520 to implement the foregoing method may store in the memory 1530. The memory 1530 is coupled to the processor 1520.

Coupling in this embodiment of this application is an indirect coupling or a communication connection between apparatuses, units, or modules, may be in an electrical form, a mechanical form, or another form, and is used for information exchange between the apparatuses, the units, or the modules.

The processor 1520 may operate in collaboration with the memory 1530. The memory 1530 may be a nonvolatile memory, for example, a hard disk drive (HDD) or a solid-state drive (SSD), or may be a volatile memory, for example, a random access memory (RAM). The memory 1530 is any other medium that can be configured to carry or store expected program code in a form of an instruction or a data structure and that can be accessed by a computer, but is not limited thereto.

In this embodiment of this application, a specific connection medium between the communications interface 1510, the processor 1520, and the memory 1530 is not limited. In this embodiment of this application, the memory 1530, the processor 1520, and the communications interface 1510 are connected through a bus in FIG. 15, and the bus is represented by a thick line in FIG. 15. A connection manner between other components is schematically described, and is not limited thereto. The bus may be classified into an address bus, a data bus, a control bus, and the like. For ease of representation, only one thick line is used to represent the bus in FIG. 15, but this does not mean that there is only one bus or only one type of bus.

Based on the foregoing embodiments, an embodiment of this application further provides a computer storage medium. The storage medium stores a software program, and when the software program is read and executed by one or more processors, the method provided in any one or more of the foregoing embodiments may be implemented. The computer storage medium may include: any medium that can store program code, such as a USB flash drive, a removable hard disk, a read-only memory, a random access memory, a magnetic disk, or an optical disc.

Based on the foregoing embodiments, an embodiment of this application further provides a chip system. The chip system includes a processor, configured to implement a function in any one or more of the foregoing embodiments, for example, obtain or process the information or data in the foregoing methods. Optionally, the chip system further includes a memory, and the memory is configured to store a program instruction and data that are necessary and executed by the processor. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include compute-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Definitely, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A system, comprising:
   a first function entity comprising:
      a first processor; and
      a first non-transitory computer-readable medium including first computer-executable instructions; and
   a second function entity comprising:
      a second processor; and
      a second non-transitory computer-readable medium including computer-executable instructions,
   wherein the first processor executes the computer-executable instructions to carry out a method including:
      sending a model update policy to the second function entity, wherein the model update policy comprises an update condition of a model of a first network element, and the model is used to indicate to adjust a parameter of the network element;
      receiving an update request sent by the second function entity, wherein the update request triggers the first function entity to perform a procedure of updating the model; and
      performing the procedure of updating the model; and
   wherein the second processor executes the computer-executable instructions to carry out a method including:
      receiving the model update policy sent by the first function entity;
      determining the model meets the update condition comprised in the model update policy; and
      sending the update request to the first function entity in accordance with determining that the model meets the update condition.

2. The system of claim 1, wherein the first function entity is an analyzing and modeling function (AMF) entity, and the second function entity is a model execution function (MEF) entity; wherein the first function entity is further configured to carry out:
   sending the model of the first network element to the MEF entity;
   wherein the performing of the procedure of updating the model of the first network element comprises:
      sending a data request to a data service function (DSF) entity, wherein the data request requests data that corresponds to the first network element and is required for updating the model of the first network element;
      receiving the data that corresponds to the first network element sent by the DSF entity, wherein the data that corresponds to the first network element comprises:
         an output result that is of the model of the first network element and that is determined by the MEF entity,
         data that generates the output result, and
         a parameter adjustment action that is of the first network element and that corresponds to the output result;
      obtaining a re-trained model of the first network element based on the data that corresponds to the first network element; and
      sending the re-trained model to the MEF.

3. The system of claim 2, wherein the model update policy further comprises an index of first data, and the first data is used to determine the model meets the update condition;
   wherein before the determining the model meets the update condition, the second function entity is further configured to carry out:
      sending a first data request to a data service function (DSF) entity, wherein the first data request comprises the index of the first data; and
      receiving the first data that is determined based on the index of the first data and that is sent by the DSF entity; and
   wherein the determining the model meets the update condition comprises determining the model meets the update condition based on the first data.

4. The system of claim 3, wherein the second function entity is further configured to carry out:
  receiving the model sent by the AMF;
  sending a second data request to the DSF entity, wherein the second data request comprises an index of a second data representing a current network environment status of the network element;
  receiving the second data determined based on the index of the second data and sent by the DSF entity;
  inputting the second data into the model to obtain an output result, wherein the result comprises a parameter adjustment action of the network element in the current network environment status; and
  sending the output result to the APF entity.

5. The system of claim 1, wherein the first function entity is an analyzing and modeling function (AMF) entity, and the second function entity is an adaptive policy function (APF) entity;
  wherein the first function entity is further configured to carry out:
    sending the model of the first network element to a model execution function (MEF) entity, before performing the procedure of updating the model of the first network element;
  wherein the performing of the procedure of updating the model comprises:
    sending a first data request to a data service function (DSF) entity, wherein the first data request requests data corresponding to the first network element and required for updating the model;
    receiving the data corresponding to the first network element and sent by the DSF entity, wherein the data corresponding to the first network element comprises:
      an output result of the model of the first network element and determined by the MEF entity, and
      a parameter adjustment action that is of the first network element and determined by the APF entity based on the output result;
    obtaining a re-trained model based on the data corresponding to the first network element; and
    sending the re-trained model to the MEF.

6. The system of claim 5, wherein the model update policy further comprises an index of a first data, and the first data is used to determine the model meets the update condition;
  wherein before the determining the model meets the update condition, the second function entity is further configured to carry out:
    sending a second data request to a data service function (DSF) entity, wherein the second data request comprises the index of the first data; and
    receiving the first data sent by the DSF entity based on the index of the first data; and
  wherein the determining the model meets the update condition comprises determining the model meets the update condition based on the first data.

7. The system of claim 6, wherein the second function entity is further configured to carry out:
  receiving an output result of the model that is sent by a model execution function (MEF) entity;
  obtaining a determined parameter adjustment action of the network element based on the output result; and
  sending the determined parameter adjustment action of the network element to the network element, to indicate to the network element to adjust the parameter of the network element based on the parameter adjustment action.

8. The system of claim 7, wherein the second function entity is further configured to carry out:
  sending the output result and the parameter adjustment action to the DSF entity, wherein the parameter adjustment action is of the network element and that corresponds to the output result, so that the DSF entity marks data that generates the output result, to update the model.

9. The system of claim 1, wherein the system further comprises a plurality of network elements comprising the first network element,
  wherein the plurality of network elements all correspond to the model of the first network element,
  wherein the plurality of network elements are managed by at least two APF entities,
  wherein the first function entity is an AMF entity,
  wherein the second function entity is any one of the at least two APF entities,
  wherein related data of the plurality of network elements is managed by at least two DSF entities,
  wherein models respectively corresponding to the plurality of network elements are configured in at least two MEFs;
  wherein after the AMF entity separately sends the model update policy to each APF entity, the performing of the procedure of updating the model comprises:
    determining a quantity of APF entities that send the update request and that are received in preset duration reaches a preset threshold;
    separately sending a data request to the at least two DSF entities, wherein the data request is used to request third data separately corresponding to the plurality of network elements and required for updating the model;
    receiving the data separately corresponding to the plurality of network elements and sent by the at least two DSF entities; and
    obtaining a re-trained model based on the data separately corresponding to the plurality of network elements, and
    separately sending the re-trained model to the at least two MEFs.

10. A model update apparatus, wherein the apparatus is applied to a first function entity and comprises:
  a processor; and
  a non-transitory computer-readable medium comprising computer-executable instructions that, when executed by the processor, facilitate carrying out a method comprising:
    sending a model update policy to a second function entity, wherein the model update policy comprises an update condition of a model of a first network element, and wherein the model of the first network element indicates to adjust a parameter of the first network element; and
    receiving an update request, wherein the update request is triggered by the second function entity in accordance with determining, by the second function entity, the model meets the update condition; and
    performing, in accordance with receiving the update request, a procedure of updating the model of the first network element.

11. The apparatus according to claim 10, wherein the model update policy further comprises an index of first data, and the first data is used to determine the model meets the update condition.

12. The apparatus according to claim 10, wherein the first function entity is an analyzing and modeling function (AMF) entity,
   wherein the second function entity is an adaptive policy function (APF) entity;
   wherein the method further comprises, before updating the model of the first network element, sending the model of the first network element to a model execution function (MEF) entity; and
   in accordance with performing the procedure of updating the model of the first network element, the method further comprises:
      sending a data request to a data service function (DSF) entity through the communications interface, wherein the data request is used to request data corresponding to the first network element and required for updating the model;
      receiving, through the communications interface, the data corresponding to the first network element and that is sent by the DSF entity, wherein the data corresponding to the first network element comprises:
         an output result of the model of the first network element and that is determined by the MEF entity, and
         a parameter adjustment action of the first network element and that is determined by the APF entity based on the output result;
      obtaining a re-trained model based on the data corresponding to the first network element; and
      sending the re-trained model to the MEF.

13. The apparatus according to claim 10, wherein a system to which the apparatus is applied comprises a plurality of network elements comprising the first network element,
   wherein the plurality of network elements all correspond to the model of the first network element,
   wherein the plurality of network elements are managed by at least two APF entities,
   wherein the first function entity is an AMF entity, the second function entity is any one of the at least two APF entities,
   wherein related data of the plurality of network elements is managed by at least two DSF entities,
   wherein models respectively corresponding to the plurality of network elements are configured in at least two MEFs;
   wherein after separately sending the model update policy to each APF entity, the performing of the procedure of updating the model comprises:
      determining a quantity of APF entities that send the update request and that are received in preset duration reaches a preset threshold;
      separately sending a data request to the at least two DSF entities, wherein the data request is used to request data separately corresponding to the plurality of network elements and required for updating the model;
      receiving, the data separately corresponding to the plurality of network elements and sent by the at least two DSF entities; and
      obtaining a re-trained model based on the data separately corresponding to the plurality of network elements, and
   separately sending the re-trained model to the at least two MEFs.

14. The apparatus according to claim 10, wherein the first function entity is an AMF entity, and the second function entity is an MEF entity;
   wherein the method further comprises:
      sending the model of the first network element to the MEF entity; and
   in accordance with performing the procedure of updating the model of the first network element, the method further comprises:
      sending a data request to a DSF entity through the communications interface, wherein the data request is used to request data that corresponds to the first network element that corresponds to the first network element and that is required for updating the model of the first network element;
      receiving the data that corresponds to the first network element sent by the DSF entity, wherein the data that corresponds to the first network element comprises:
         an output result that is of the model of the first network element and that is determined by the MEF entity,
         data that generates the output result, and
         a parameter adjustment action that is of the first network element and that corresponds to the output result;
      obtaining a re-trained model of the first network element based on the data that corresponds to the first network element; and
      sending the re-trained model to the MEF.

15. A model update apparatus, wherein the apparatus is applied to a second function entity and comprises:
   a processor; and
   a non-transitory computer-readable medium comprising computer-executable instructions that, when executed by the processor, facilitate carrying out a method comprising:
      receiving a model update policy sent by a first function entity, wherein the model update policy comprises an update condition of a model, and the model is used to indicate to adjust a parameter of a network element;
      determining, based on the model update policy, the model meets the update condition; and
      sending an update request to the first function entity when determining that the model meets the update condition, wherein the update request is used to trigger the first function entity to perform a procedure of updating the model.

16. The apparatus according to claim 15, wherein the first function entity is an analyzing and modeling function (AMF) entity,
   wherein the second function entity is an adaptive policy function (APF) entity; and
   wherein the model update policy further comprises an index of first data, and the first data is used to determine the model meets the update condition;
   wherein the method further comprises:
      before the determining the model meets the update condition, sending a data request to a data service function (DSF) entity, wherein the data request comprises the index of the first data; and
      receiving, the first data sent by the DSF entity based on the index of the first data; and
   wherein the determining the model meets the update condition comprises determining the model meets the update condition based on the first data.

17. The apparatus according to claim 16, wherein the method further comprises:
  receiving an output result of the model that is sent by a model execution function (MEF) entity;
  obtaining a determined parameter adjustment action of the network element based on the output result; and
  sending the determined parameter adjustment action of the network element to the network element, to indicate to the network element to adjust the parameter of the network element based on the parameter adjustment action.

18. The apparatus according to claim 17, wherein the method further comprises:
  sending, to the DSF entity, the output result and the parameter adjustment action that is of the network element and that corresponds to the output result, so that the DSF entity marks data that generates the output result, to update the model.

19. The apparatus according to claim 15, wherein the first function entity is an analyzing and modeling function AMF entity, and the second function entity is a model execution function (MEF) entity; and the model update policy further comprises an index of first data, and the first data is used to determine whether the model meets the update condition; the method further comprises:
  wherein before the determining the model meets the update condition, sending a first data request to a data service function (DSF) entity, wherein the first data request comprises the index of the first data; and
  receiving the first data that is determined based on the index of the first data and that is sent by the DSF entity; and
  wherein the determining the model meets the update condition comprises:
    determining the model meets the update condition based on the first data.

20. The apparatus according to claim 19, wherein the method further comprises:
  receiving the model sent by the AMF;
  sending a second data request to the DSF entity, wherein the second data request comprises an index of second data representing a current network environment status of the network element; and
  receiving the second data determined based on the index of the second data and that is sent by the DSF entity;
  inputting the second data into the model to obtain an output result, wherein the result comprises a parameter adjustment action of the network element in the current network environment status; and
  sending the output result to the APF entity.

21. A method carried out by a system comprising a first function entity and a second function entity, the method comprising:
  the first function entity:
    sending a model update policy to the second function entity, wherein the model update policy comprises an update condition of a model of a network element, and the model is used to indicate to adjust a parameter of the network element;
    receiving an update request sent by the second function entity, wherein the update request triggers the first function entity to perform a procedure of updating the model; and
    performing the procedure of updating the model; and
  the second function entity:
    receiving the model update policy sent by the first function entity;
    determining the model meets the update condition comprised in the model update policy; and
    sending the update request to the first function entity in accordance with determining that the model meets the update condition.

22. A model update method carried out by a first function entity, the method comprising:
  sending a model update policy to a second function entity, wherein the model update policy comprises an update condition of a model of a first network element, and wherein the model of the first network element indicates to adjust a parameter of the first network element; and
  receiving an update request, wherein the update request is triggered by the second function entity in accordance with determining, by the second function entity, the model meets the update condition; and
  performing, in accordance with receiving the update request, a procedure of updating the model of the first network element.

23. A model update method carried out by a second function entity, the method comprising:
  receiving a model update policy sent by a first function entity, wherein the model update policy comprises an update condition of a model, and the model is used to indicate to adjust a parameter of a network element;
  determining, based on the model update policy, the model meets the update condition; and
  sending an update request to the first function entity when determining that the model meets the update condition, wherein the update request is used to trigger the first function entity to perform a procedure of updating the model.

* * * * *

UNITED STATES PATENT AND TRADEMARK OFFICE
CERTIFICATE OF CORRECTION

| | |
|---|---|
| PATENT NO. | : 11,451,452 B2 |
| APPLICATION NO. | : 17/081570 |
| DATED | : September 20, 2022 |
| INVENTOR(S) | : Wu et al. |

It is certified that error appears in the above-identified patent and that said Letters Patent is hereby corrected as shown below:

In the Claims

Claim 9: Column 34, Line 33: "request third data separately corresponding to the" should read -- request data separately corresponding to the --.

Claim 12: Column 35, Line 21: "that is sent by the DSF entity, wherein the data" should read -- sent by the DSF entity, wherein the data --.

Signed and Sealed this
Fourteenth Day of February, 2023

*Katherine Kelly Vidal*

Katherine Kelly Vidal
*Director of the United States Patent and Trademark Office*